United States Patent
Kataoka et al.

(10) Patent No.: US 9,448,931 B2
(45) Date of Patent: Sep. 20, 2016

(54) ENDIAN CONVERSION METHOD AND SYSTEM

(71) Applicant: FUJITSU LIMITED, Kawasaki-shi, Kanagawa (JP)

(72) Inventors: Akihito Kataoka, Hamura (JP); Koichiro Yamashita, Hachioji (JP); Naoki Odate, Akiruno (JP); Takahisa Suzuki, Kawasaki (JP); Hiromasa Yamauchi, Kawasaki (JP); Koji Kurihara, Kawasaki (JP); Toshiya Otomo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 241 days.

(21) Appl. No.: 14/029,425

(22) Filed: Sep. 17, 2013

(65) Prior Publication Data
US 2014/0019710 A1 Jan. 16, 2014

Related U.S. Application Data

(63) Continuation of application No. PCT/JP2011/056660, filed on Mar. 18, 2011.

(51) Int. Cl.
| G06F 13/10 | (2006.01) |
| G06F 12/06 | (2006.01) |
| G06F 7/76 | (2006.01) |

(52) U.S. Cl.
CPC ............ *G06F 12/06* (2013.01); *G06F 7/768* (2013.01); *G06F 2213/0038* (2013.01)

(58) Field of Classification Search
None
See application file for complete search history.

(56) References Cited

U.S. PATENT DOCUMENTS

| 5,687,337 | A | 11/1997 | Carnevale et al. | |
| 5,961,640 | A * | 10/1999 | Chambers | G06F 13/4013 703/20 |
| 2007/0038429 | A1 | 2/2007 | Tatsuoka et al. | |
| 2007/0299863 | A1* | 12/2007 | Fu et al. | 707/102 |
| 2008/0028197 | A1* | 1/2008 | Sawai | 712/300 |

FOREIGN PATENT DOCUMENTS

| JP | 8-278918 | 10/1996 | |
| JP | 2000-305892 | 11/2000 | |
| JP | 2000-330760 | 11/2000 | |
| JP | 2000-330760 A * | 11/2000 | ............... G06F 5/00 |
| JP | 3758732 | 3/2006 | |
| JP | 2007-34680 | 2/2007 | |
| JP | 4114900 | 7/2008 | |
| JP | 4346587 | 10/2009 | |
| JP | 2011-39964 | 2/2011 | |

OTHER PUBLICATIONS

Japanese International Preliminary Report on Patentability issued Oct. 3, 2013 corresponding to International Application No. PCT/JP2011/056660.
International Search Report mailed May 24, 2011 in corresponding International Application No. PCT/JP2011/056660.
Japanese Office Action dated Sep. 30, 2014 in corresponding Japanese Patent Application No. 2013-505650.

\* cited by examiner

*Primary Examiner* — Ilwoo Park
(74) *Attorney, Agent, or Firm* — Staas & Halsey LLP

(57) ABSTRACT

An endian conversion method is executed by a CPU, and includes executing a program that includes endian conversion setting; and performing, when accessing an address of a main memory indicated in the endian conversion setting, endian conversion of data specified by the address of the main memory.

12 Claims, 19 Drawing Sheets

ENDIAN CONVERSION METHOD AND SYSTEM

CROSS REFERENCE TO RELATED APPLICATIONS

This application is a continuation application of International Application PCT/JP2011/056660, filed on Mar. 18, 2011 and designating the U.S., the entire contents of which are incorporated herein by reference.

FIELD

The embodiments discussed herein are related to an endian conversion method and a system that perform endian conversion.

BACKGROUND

Byte order is arrangement of data in terms of bytes and is conventionally prescribed as specifications of a processor and a data format when the processor handles multiple bytes. The byte order is broadly classified into little endian and big endian. The little endian is the arrangement in which bytes are stored in the order from the least significant byte. The big endian is the arrangement in which bytes are stored in the order from the most significant byte.

If byte order specification of a processor is different from data format specification, when processing corresponding data, the processor rearranges the data in terms of bytes. The rearrangement in terms of bytes is referred to as endian conversion.

For example, a technique is disclosed that, when an apparatus transmits/receives data with respect to another apparatus having byte order different from the apparatus, that apparatus transmits the data after software swaps the data or swaps received data before reading the data (hereinafter referred to as a conventional technique 1).

A technique of performing the endian conversion is disclosed as a technique of performing the endian conversion within a processor (see, e.g., Japanese Laid-Open Patent Publication Nos. H8-278918 and 2007-34680). A technique of performing the endian conversion by other hardware is disclosed as a technique of performing the endian conversion with a bus having a swap circuit (see, e.g., Japanese Laid-Open Patent Publication No. 2000-305892).

However, in the conventional techniques described above, the technique according to the conventional technique 1 uses conversion by software and therefore has a problem of deterioration in processing performance. Although the techniques according to Japanese Laid-Open Patent Publication Nos. H8-278918 and 2007-34680 enables high-speed processing because hardware can be used, a processor operates at high speed and therefore, if an endian conversion mechanism is added, it is problematically difficult to maintain the processing performance of the processor. Although the technique according to Japanese Laid-Open Patent Publication No. 2000-305892 enables endian conversion of entire bus width, it is difficult to perform the endian conversion with a complicated data structure such as performing the endian conversion for a portion of an address range within the bus width.

SUMMARY

According to an aspect of an embodiment, an endian conversion method is executed by a CPU, and includes executing a program that includes endian conversion setting; and performing, when accessing an address of a main memory indicated in the endian conversion setting, endian conversion of data specified by the address of the main memory.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of an endian conversion method and a system will be described in detail with reference to the accompanying drawings.

Figure 1:
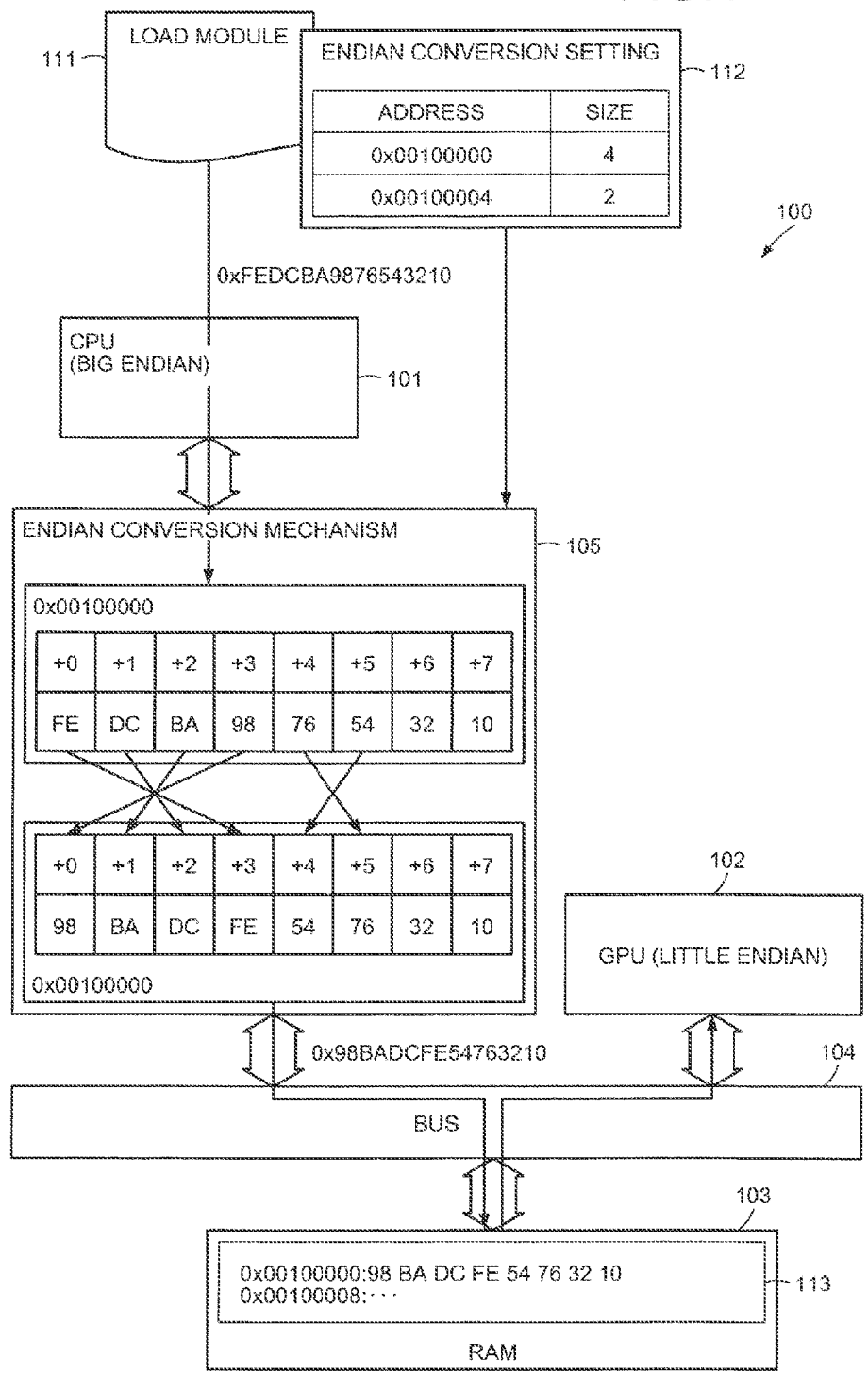
FIG. 1 is an explanatory view of endian conversion operation of a system 100 according to a first embodiment.

FIG. 1 is an explanatory view of endian conversion operation of a system 100 according to a first embodiment. The system 100 includes a central processing unit (CPU) 101, a graphical processing unit (GPU) 102, and a random access memory (RAM) 103. The units are connected through a bus 104. The CPU 101 and the bus 104 are connected through an endian conversion mechanism 105. It is assumed that the endian of the CPU 101 is big endian while the endian of the GPU 102 is little endian. The CPU 101 and the RAM 103 will be described in detail with reference to FIG. 2.

It is also assumed that the CPU 101 loads a load module 111 executable by the CPU 101. It is assumed that application software (hereinafter referred to as "application") generated by executing the load module 111 is an image editing application. The load module 111 is correlated with an endian conversion setting 112. A memory area 113 in the RAM 103 represents memory contents after an address 0x00100000.

The endian conversion setting 112 has two fields including address and size. The endian conversion setting 112 depicted in FIG. 1 has a description of instructions for performing endian conversion of 4 [bytes] starting from the address 0x00100000 and for performing endian conversion of 2 [bytes] starting from the address 0x00100004.

When activating the application by the load module, the CPU 101 notifies the endian conversion mechanism 105 of the endian conversion setting 112. It is assumed that the application executes an image process for the GPU 102. Since the endian is different between the CPU 101 and the GPU 102, an endian conversion process occurs. It is assumed that data used as an argument of the image process is stored in 8 [bytes] from 0x00100000.

The CPU 101 gains write access through the application to the address 0x00100000. The data to be written is 0xFEDCBA9876543210. The endian conversion mechanism 105 detects the write access and converts data arrangement according to the endian conversion setting 112.

For example, the endian conversion mechanism 105 swaps data of zeroth to third bytes of 0x00100000. As a result, the data of the zeroth to third bytes of 0x00100000 is converted from 0xFEDCBA98 to 0x98BADCFE. The endian conversion mechanism 105 swaps data of fourth to fifth bytes of 0x00100000. As a result, the data of the fourth to fifth bytes of 0x00100000 is converted from 0x7654 to 0x5476.

As a result of the conversions, the endian conversion mechanism 105 converts the data of the write access to 0x98BADCFE54763210 and outputs the data. Subsequently, the GPU 102 reads data acting as the argument of the image process from the memory area 113.

As described above, the system 100 notifies the endian conversion mechanism 105 outside the CPU 101 of the range subjected to the endian conversion at the start of a program and the endian conversion mechanism 105 performs the endian conversion for the specified range. This enables the system 100 to perform the endian conversion in a location less likely to adversely affect the performance of the system 100 and to perform complicated conversion such as performing endian conversion for a portion of an address range within the width of the bus 104.

Figure 2:
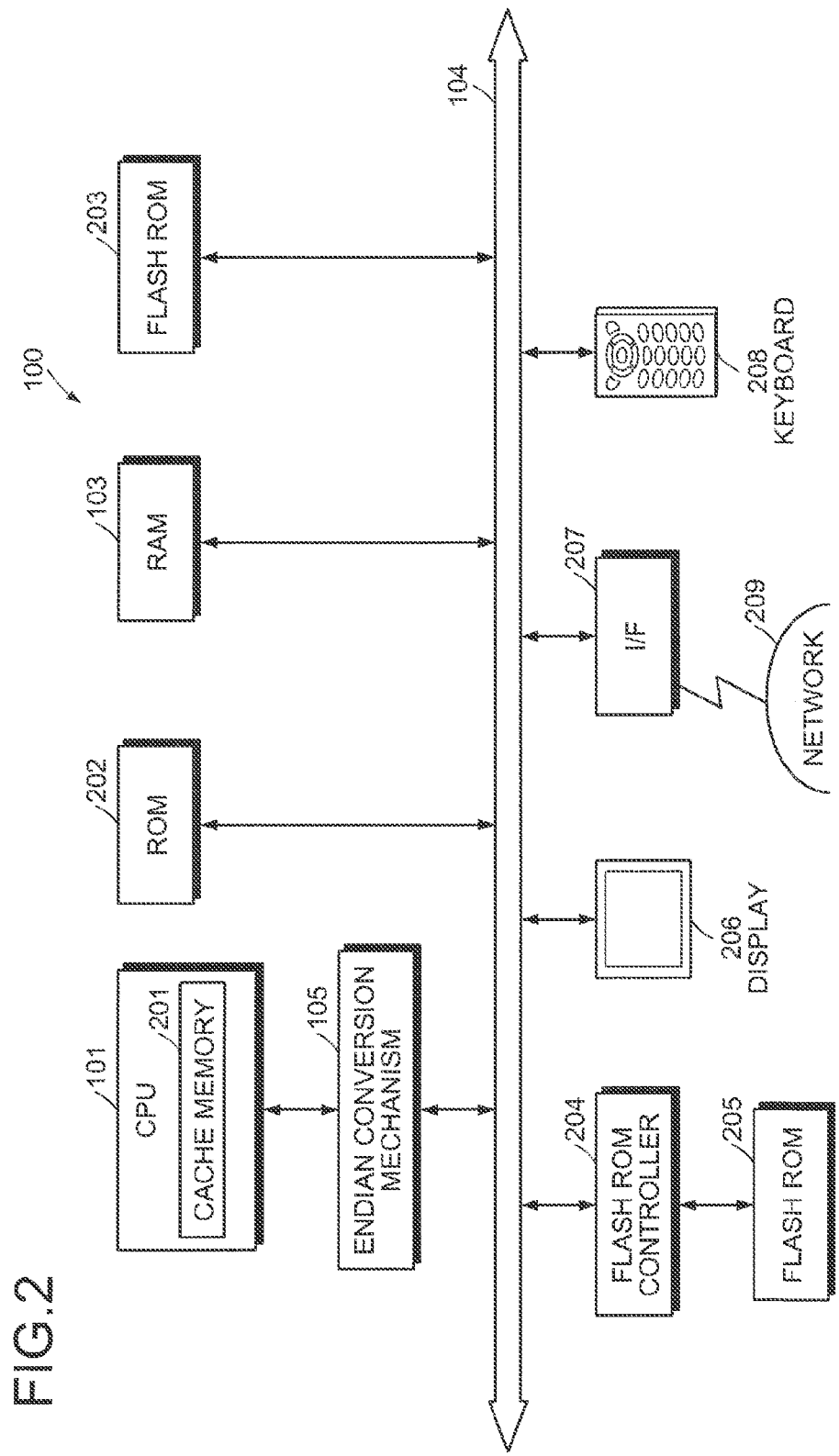
FIG. 2 is a block diagram of hardware of the system 100 according to the first embodiment.

FIG. 2 is a block diagram of hardware of the system 100 according to the first embodiment. In FIG. 2, the system 100 includes the CPU 101, a read-only memory (ROM) 202, and the RAM 103. The system 100 includes a flash ROM 203, a flash ROM controller 204, and a flash ROM 205. The system 100 includes a display 206, an interface (I/F) 207, and a keyboard 208 as input/output apparatuses for a user and other devices. The units are connected through the bus 104. The system 100 may omit the GPU 102 depicted in FIG. 1 and may include a digital signal processor (DSP) instead of the GPU 102.

The CPU 101 is responsible for overall control of the system 100. The CPU 101 may be a multicore processor system that includes at least two CPUs. A multicore processor system is a system of a computer that includes a processor equipped with multiple cores. As long as multiple cores are provided, the multicore processor system may be a single processor equipped with multiple cores or a group of single-core processors arranged in parallel. The CPU 101 includes a dedicated cache memory 201.

The CPU 101 and the bus 104 are connected through the endian conversion mechanism 105. If the system 100 includes multiple CPUs, the CPUs are connected through the respective endian conversion mechanisms 105 to the bus 104. Although in the system 100 depicted in FIG. 2, the endian conversion mechanism 105 is disposed between the CPU 101 and the bus 104, the endian conversion mechanism 105 may be disposed at a position of a bus interface etc., to an external destination outside the large scale integration (LSI), for example.

The ROM 202 stores programs such as a boot program. The RAM 103 is used as a work area of the CPU 101. The flash ROM 203 is a flash ROM with high readout speed and is a NOR flash memory, for example. The flash ROM 203 stores system software such as an operating system (OS), applications, etc. For example, when the OS is updated, the system 100 receives a new OS through the I/F 207 and updates the old OS stored in the flash ROM 203 with the received new OS.

The flash ROM controller 204 controls the reading and writing of data with respect to the flash ROM 205, under the control of the CPU 101. The flash ROM 205 is a flash ROM for the main purpose of storage and transfer of data and is a NAND flash memory, for example. The flash ROM 205 stores data written under the control of the flash ROM controller 204. Specific examples of data include image data, video data, etc., acquired through the I/F 207 by a user using the system 100, and a program executing the endian conversion method according to this embodiment may be stored. For example, a memory card and an SD card may be employed as the flash ROM 205.

The display 206 displays, for example, data such as text, images, functional information, etc., in addition to a cursor, icons, and/or tool boxes. A thin-film-transistor (TFT) liquid crystal display and the like may be employed as the display 206.

The I/F 207 is connected to a network 209 such as a local area network (LAN), a wide area network (WAN), and the Internet through a communication line and is connected to other apparatuses through the network 209. The I/F 207 administers an internal interface with the network 209 and controls the input and output of data with respect to external apparatuses. For example, a modem or a LAN adaptor may be employed as the I/F 207.

The keyboard 208 includes, for example, keys for inputting letters, numerals, and various instructions and performs the input of data. Alternatively, a touch-panel-type input pad or numeric keypad, etc. may be adopted.

Figure 3:
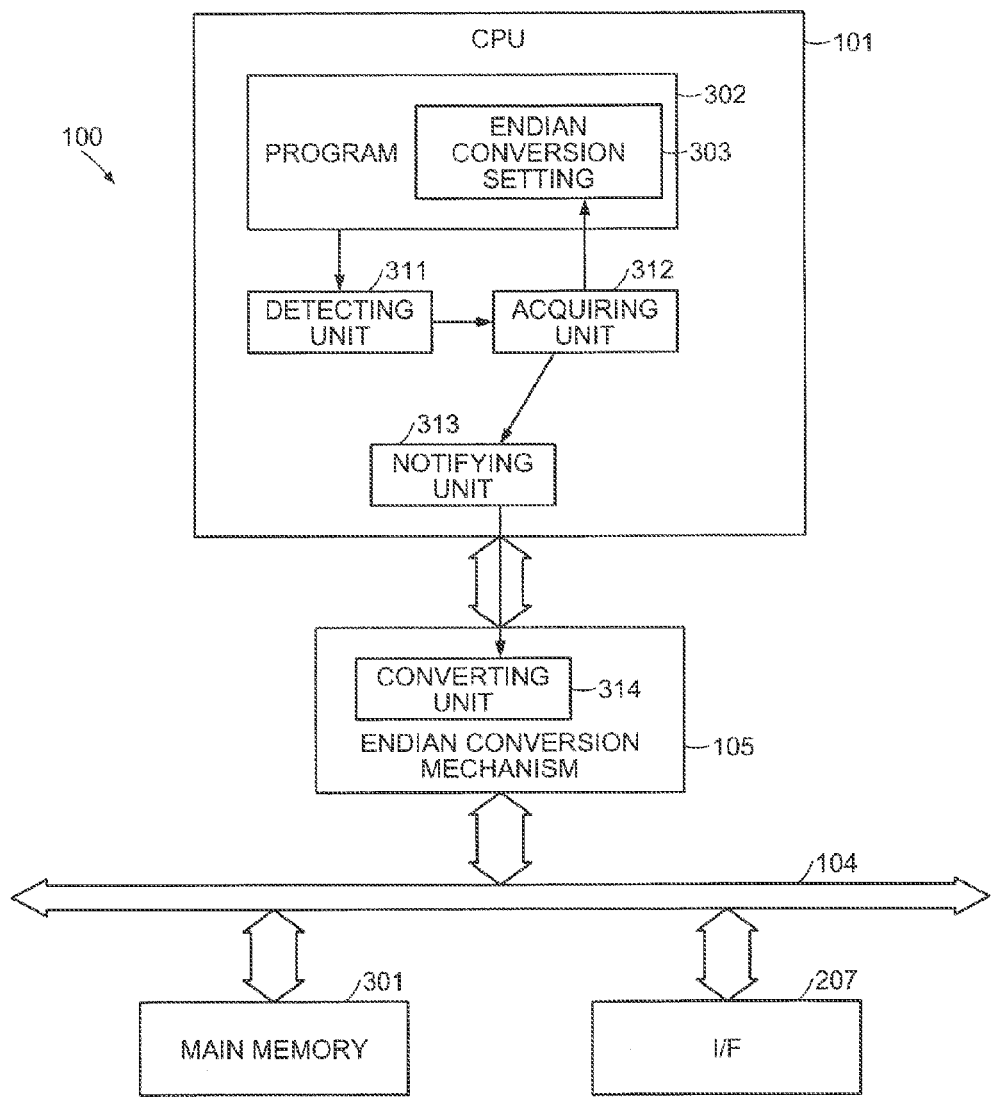
FIG. 3 is a block diagram of functions of the system 100.

Functions of the system 100 will be described. FIG. 3 is a block diagram of functions of the system 100. The system 100 includes a detecting unit 311, an acquiring unit 312, a notifying unit 313, and a converting unit 314. The functions acting as a control unit (the detecting unit 311 to the notifying unit 313) are implemented by executing on the CPU 101, programs stored in a storage device. For example, the storage device includes the ROM 202, the RAM 103, the flash ROM 203, and the flash ROM 205 depicted in FIG. 2. The system 100 can access a main memory 301.

The system 100 can execute a program 302 including an endian conversion setting 303. The converting unit 314 is executed by the endian conversion mechanism 105 to implement the function thereof. The endian conversion setting 303 has description of an address range to be subjected to the endian conversion. A method of specifying the address range may be combination of a start address and an end address or combination of a start address and a size.

The main memory 301 is a primary storage device that can be accessed by the CPU 101. For example, the main memory 301 may be the entire RAM 103 or a portion of the RAM 103.

The detecting unit 311 has a function of detecting that a program including the endian conversion setting is executed. For example, the detecting unit 311 detects that the program 302 including the endian conversion setting 303 is executed. Information indicative of the detection is stored in a storage area such as a register of the CPU 101, a cache memory, and the main memory 301.

The acquiring unit 312 has a function of acquiring the endian conversion setting of the program if the detecting unit 311 detects that the program is executed. For example, the acquiring unit 312 acquires the endian conversion setting 303. The acquired endian conversion setting 303 is stored in the storage area such as the register of the CPU 101, the cache memory, and the main memory 301.

The notifying unit 313 has a function of notifying the converting unit 314 of the acquired endian conversion setting. For example, the notifying unit 313 notifies the converting unit 314 of the endian conversion setting 303. Information indicative of the notification is stored in the storage area such as the register of the CPU 101, the cache memory, and the main memory 301.

The converting unit 314 has a function of performing the endian conversion of data specified by an address of the main memory 301 when accessing the address of the main memory 301, based on the endian conversion setting of the notification. For example, it is assumed that the endian conversion setting 303 has description of a command for performing the endian conversion of two bytes from the address 0x00100004. In this case, when accessing the addresses 0x00100000 to 0x0010000F, the converting unit 314 swaps data of 0x00100004 and 0x00100005 to perform the endian conversion.

As described above, the system 100 includes between the CPU 101 and the bus 104, the converting unit 314 that converts the order in a byte string within an address range specified by access from the CPU 101 and detects that the program is executed by the CPU 101. If the program is detected, the system 100 subsequently causes the CPU 101 to acquire the address range for conversion of the order in the byte string corresponding to the program and causes the CPU 101 to notify the converting unit 314 of the address range.

Figure 4:
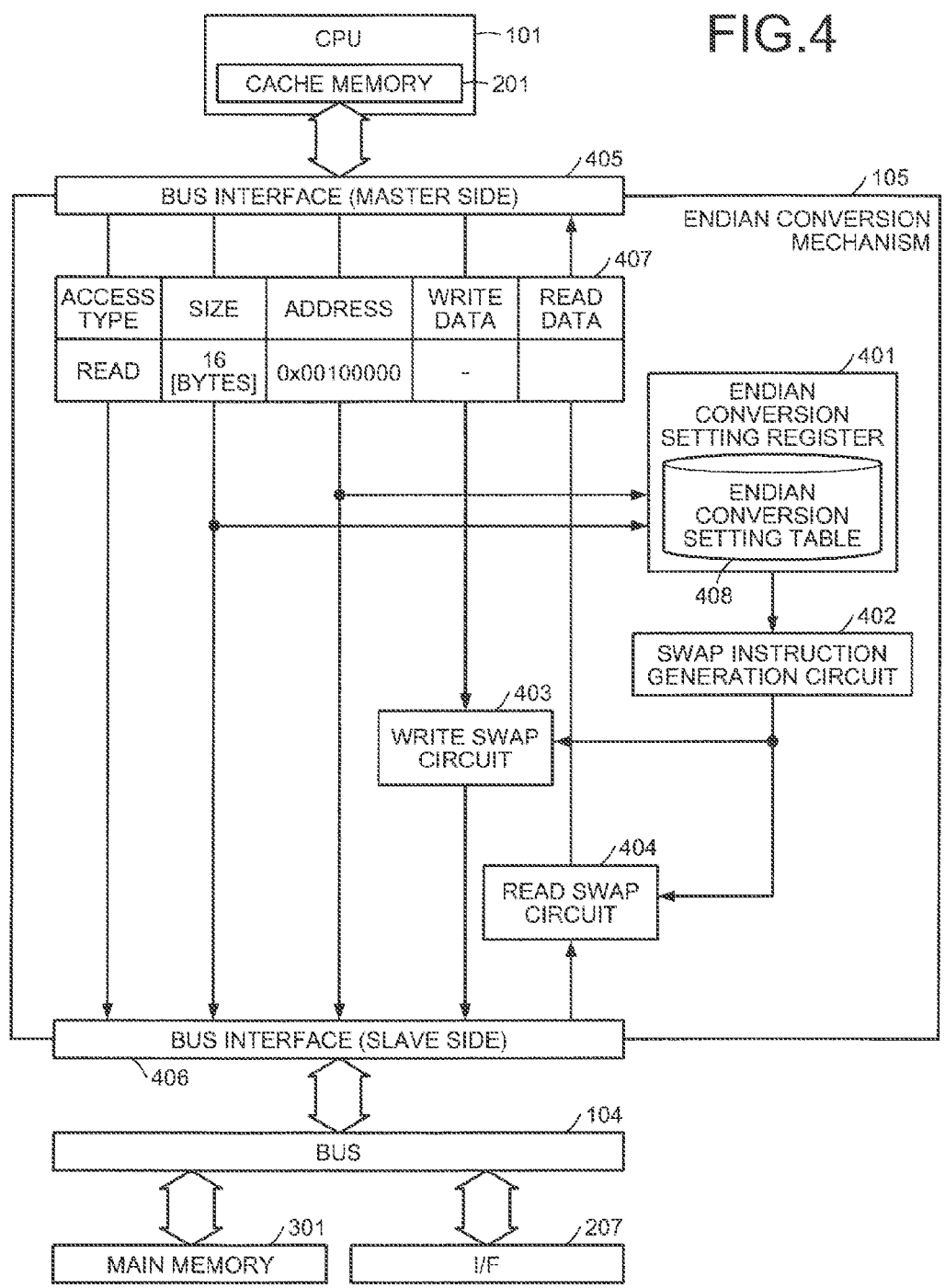
FIG. 4 is an explanatory view of the inside of an endian conversion mechanism 105.

FIG. 4 is an explanatory view of the inside of the endian conversion mechanism 105. The endian conversion mechanism 105 includes an endian conversion setting register 401, a swap instruction generation circuit 402, a write swap circuit 403, and a read swap circuit 404. The endian conversion mechanism 105 includes a bus interface (master side) 405 acting as an interface with the CPU 101 and a bus interface (slave side) 406 acting as an interface with the bus 104.

The endian conversion setting register 401 is a register storing an endian conversion setting table 408 that includes an instruction area of the endian conversion and individual conversion setting contents in the instruction area. Details of the endian conversion setting register 401 will be described later with reference to FIG. 5. An example of generation of endian conversion setting information underlying the endian conversion setting table 408 will be described later with reference to FIG. 6.

The swap instruction generation circuit 402 is a circuit that, when bus access occurs, generates swap instructions of a predetermined unit, based on the address of the bus access and the size of the bus access. The predetermined unit is a unit of bytes, for example. For example, the swap instruction generation circuit 402 refers to the endian conversion setting table 408 and generates swap instructions based on individual endian conversion settings that are equivalent in number to the bus access size (number of bytes). An example of swap instructions generated by the swap instruction generation circuit 402 will be described later with reference to FIG. 5.

The write swap circuit 403 is a circuit that based on the swap instruction information of the swap instruction generation circuit 402, rearranges by a predetermined unit, data that is transmitted from the bus interface (master side) 405 at the time of write access to the bus 104. Similarly, the read swap circuit 404 is a circuit that based on the swap instruction information of the swap instruction generation circuit 402, rearranges by a predetermined unit, data that is transmitted from the bus interface (slave side) 406 at the time of read access to the bus 104.

The bus interface (master side) 405 and the bus interface (slave side) 406 transmit/receive data according to a data format 407. The data format 407 includes three fields including access type, size, and address. The data format also includes either a write data field or a read data field depending on a value obtained as the access type.

The access type field stores an identifier indicative of whether data to be transmitted/received is data consequent to a read access or data consequent to a write access. For example, "READ" in the access type field indicates data consequent to a read access and "WRITE" in the access type field indicates data consequent to a write access. The size field stores a data size of transmitted/received data. The address field stores an initial address of transmitted/received data. The write data field stores data transmitted at the time of write access. The read data field stores data received at the time of read access.

For example, in the example of FIG. 4, it is assumed that the CPU 101 issues a read access for 16 bytes starting from the address 0x00100000. In this case, the bus interface (slave side) 406 transmits data with "READ" stored in the access type field, 16 [bytes] stored in the size field, "0x00100000" stored in the address field, and read data stored in the read data field.

The swap instruction generation circuit 402 refers to the size field and the address field of the data format 407 to acquire the individual endian conversion setting and generates swap instructions. The write swap circuit 403 performs a swap for the write data field if swap instructions are present. Similarly, the read swap circuit 404 performs a swap for the read data field if swap instructions are present.

The endian conversion mechanism 105 may perform transfers of the same size as the bus width of the bus interface (master side) 405 and the bus interface (slave side) 406 or may perform transfers of a size less than or equal to the bus width. For example, the endian conversion mechanism 105 may transfer data such that the size field indicates 8 [bytes].

Figure 5:
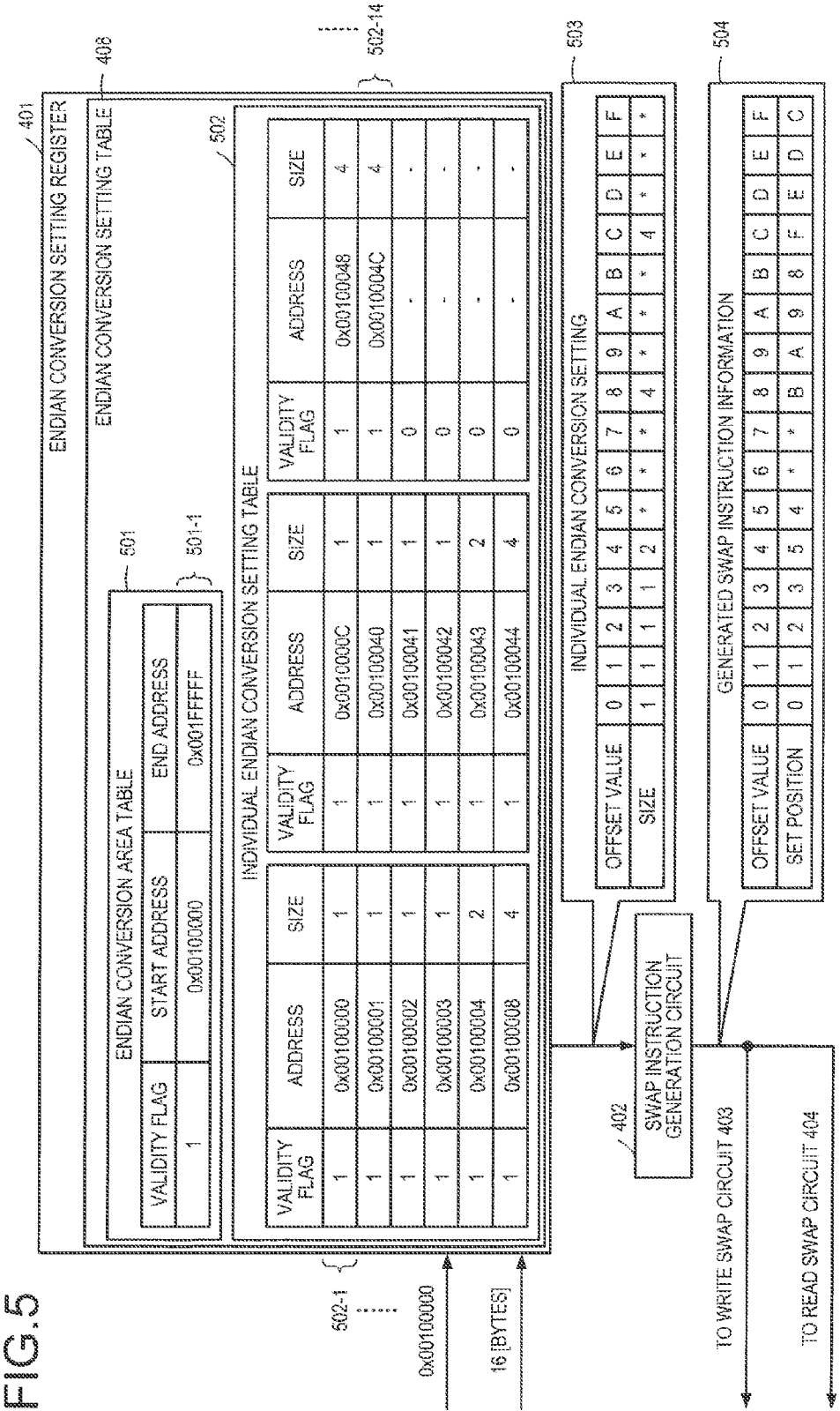
FIG. 5 is an example of the contents of the endian conversion setting register 401 and an example of swap instruction generation according to the first embodiment.

FIG. 5 is an example of the contents of the endian conversion setting register 401 and an example of swap instruction generation according to the first embodiment. The endian conversion setting register 401 stores the endian conversion setting table 408. The endian conversion setting table 408 includes an endian conversion area table 501 and an individual endian conversion setting table 502.

The endian conversion area table 501 includes three fields of validity flag, start address, and end address. The validity flag field stores a value that indicates whether the corresponding record is valid. For example, if the validity flag field has "1", this indicates that the corresponding record is valid. If the validity flag field has "0", this indicates that the corresponding record is invalid. The start address field stores an initial address to be subjected to the endian conversion. The end address field stores an end address to be subjected to the endian conversion.

For example, the endian conversion area table 501 depicted in FIG. 5 indicates that a record 501-1 is valid and that an object area of endian conversion is from 0x00100000 to 0x001FFFFF. Although the record 501-1 is registered in the endian conversion area table 501, multiple records may be registered.

The individual endian conversion setting table 502 has three fields including validity flag, address, and size. The validity flag field stores a value that indicates whether the corresponding record is valid. The address field stores an initial address from which a swap is started. The size field stores the number of bytes to be swapped. One record of the individual endian conversion setting table 502 is referred to as one entry.

For example, the individual endian conversion setting table 502 depicted in FIG. 5 has entries 502-1 to 502-14 registered as a valid record group. The entries 502-1 to 502-4 represent the individual endian conversion setting of one byte starting from the addresses 0x00100000 to 0x00100003. The entry 502-5 represents the individual endian conversion setting of two bytes starting from the address 0x00100004. The entries 502-6 and 502-7 represent the individual endian conversion setting of four bytes starting from the addresses 0x00100008 and 0x0010000C.

Similarly, the entries 502-8 to 502-11 represent the individual endian conversion setting of one byte starting from the addresses 0x00100040 to 0x00100043. The entry 502-12 represents the individual endian conversion setting of two bytes starting from the address 0x00100044. The entries 502-13 and 502-14 represent the individual endian conversion setting of four bytes starting from the addresses 0x00100048 and 0x0010004C.

The swap instruction generation circuit 402 detects access to 16 [bytes] starting from 0x00100000. In the following description, 0x00100000 is set as an object address. The swap instruction generation circuit 402 determines whether the object address is within an address range defined by the start address and the end address of the endian conversion area table 501. Since the object address is within the address range in the example of FIG. 5, the swap instruction generation circuit 402 then acquires offset values and swap sizes used as the individual endian conversion setting for 16 [bytes] from the start address. The offset values are offset values represented in hexadecimal.

The acquired object offsets and swap sizes are values depicted in individual endian conversion setting 503 corresponding to the object address. For example, offset values 0 to 3 have a swap size of 1; an offset value 4 has a swap size of 2; and offset values 8 and C have a swap size of 4. After the acquisition, the swap instruction generation circuit 402 generates swap instruction information 504 in terms of bytes. The swap instruction generation circuit 402 notifies the write swap circuit 403 and the read swap circuit 404 of the generated swap instruction information 504.

For example, the instruction contents of the swap instruction information 504 indicate that the data of the offset value 4 is to be set at the data position of the offset value 5 and the data of the offset value 5 is to be set at the data position of the offset value 4. Similarly, the instruction contents of the swap instruction information 504 indicate that the data of the offset value 8 is to be set at the data position of the offset value B and cause the data of the offset value 9 is to be set at the data position of the offset value A. The instruction contents of the swap instruction information 504 indicate that the data of the offset value A is to be set at the data position of the offset value 9 and the data of the offset value B is to be set at the data position of the offset value 8. Similarly, the instruction contents of the swap instruction information 504 indicate that the offset values C to F are to be set at the data positions of the offset values F to C, respectively.

Figure 6:
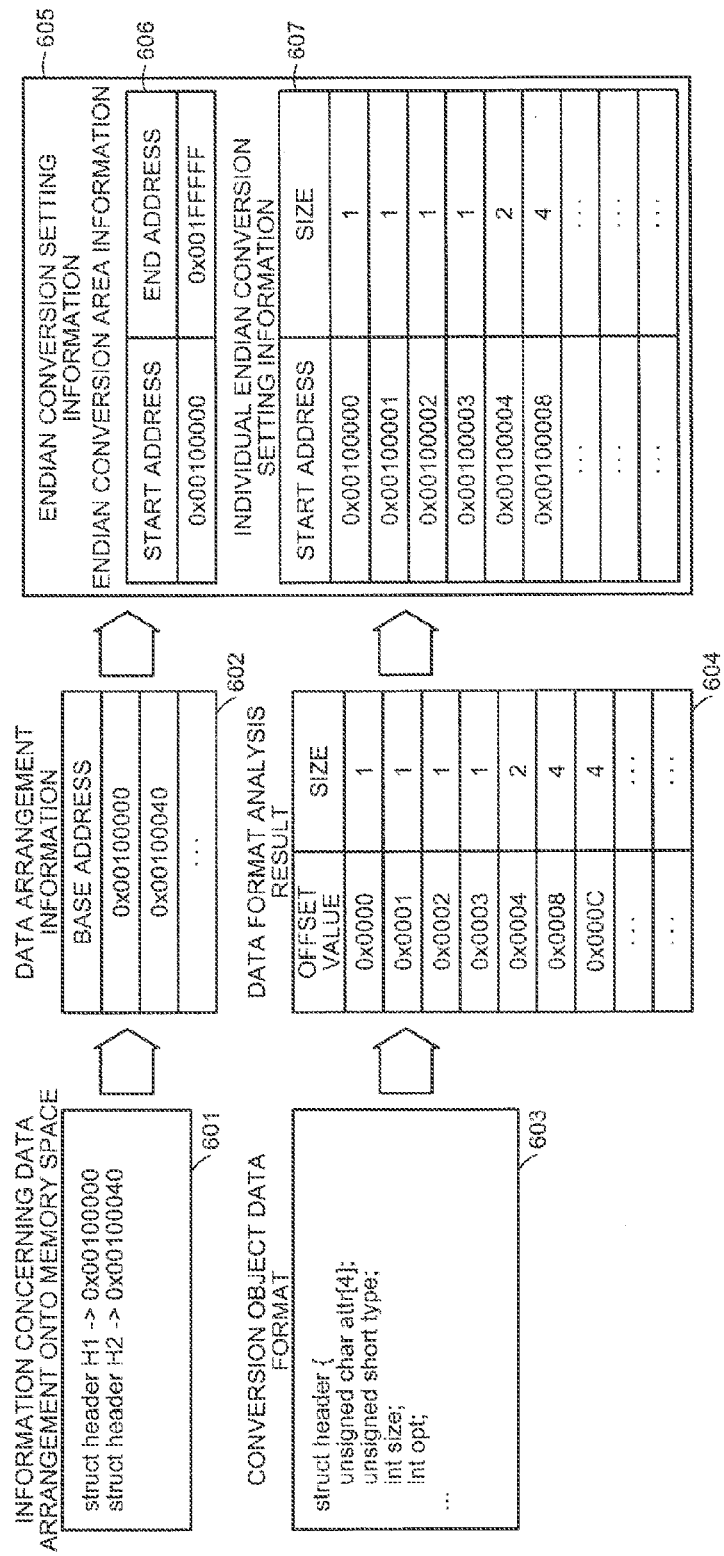
FIG. 6 is an explanatory view of an example of generation of endian conversion setting information.

FIG. 6 is an explanatory view of an example of generation of endian conversion setting information. The endian conversion setting information is generated by a compiler and a linker at the time of generation of a load module. The linker assigns a global variable present in a program to a memory space at the time of generation of a load module. For example, for information on data arrangement onto a memory space depicted in a rectangle 601, the linker assigns global variables H1 and H2 having a form of a header structure by using 0x00100000 and 0x00100040, respectively, as base addresses. The linker generates data arrangement information 602 from the base addresses of the assignment.

The compiler analyzes offset values from the base addresses and sizes of members of the structure, based on a conversion object data format of the header structure depicted in a rectangle 603 at the time of generation of an object file to generate data format analysis result 604. For example, for a member variable attr[4] that is arrangement of unsigned one-byte data of the header structure, the compiler analyzes that attr[0] has an offset value 0x0000 and size 1. Similarly, the compiler analyzes that attr[1] has an offset value 0x0001 and size 1, analyzes that attr[2] has an offset value 0x0002 and size 1, and analyzes that attr[3] has an offset value 0x0003 and size 1.

Similarly, the compiler analyzes that unsigned two-byte data of a member variable "type" has an offset value 0x0004 and size 2. The compiler analyzes that four-byte data of a member variable "size" has an offset value 0x0004 and size 2 and analyzes that four-byte data of a member variable "opt" has an offset value 0x0004 and size 2.

The linker generates endian conversion setting information 605 based on the data arrangement information 602 and the data format analysis result 604. The endian conversion setting information 605 includes endian conversion area information 606 and individual endian conversion setting information 607. The endian conversion area information 606 and the individual endian conversion setting information 607 are information acquired by removing the validity flag fields from the endian conversion area table 501 and the individual endian conversion setting table 502 in the endian conversion setting table 408. Therefore, the fields of the endian conversion area information 606 and the individual endian conversion setting information 607 will not be described.

The linker sets the start address and the end address of the endian conversion area table 501 such that the base address group of the data arrangement information 602 is entirely included. Although the linker sets the start address and the end address as a continuous area of 0x00100000 to 0x001FFFFF in FIG. 6, multiple areas may separately be set in two or more records. The linker sets an address in the individual endian conversion setting table 502 to a value acquired by adding a base address of the data arrangement information 602 and an offset value of the data format analysis result 604.

As a result, the endian conversion setting information 605 is generated by the compiler and the linker. The endian conversion setting information 605 may be generated by a designer etc., of an application.

Figure 7:
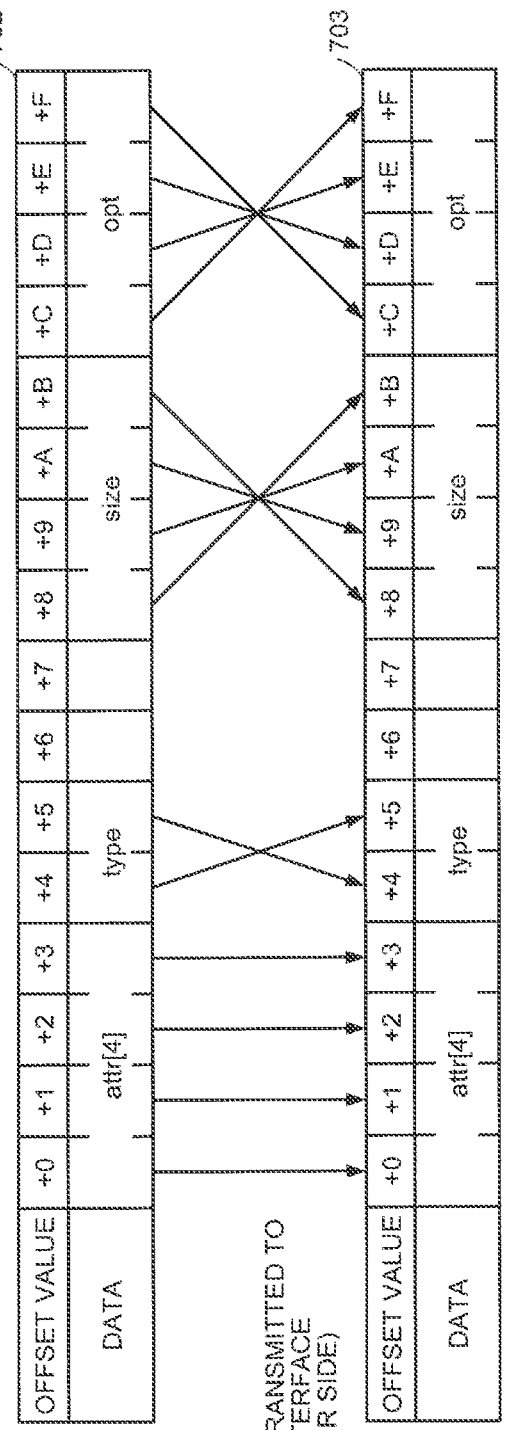
FIG. 7 is an explanatory view of an endian conversion example.

FIG. 7 is an explanatory view of an endian conversion example. FIG. 7 depicts an endian conversion example of the read swap circuit 404. To the bus 104, the CPU 101 transmits bus access information 701 including a read access having an address size of 16 [bytes] and an access destination address 0x00100000. The bus 104 acquires data of the access destination address from the main memory 301 etc., and notifies the endian conversion mechanism 105 of the data. The endian conversion mechanism 105 converts the data 702 transmitted from the bus interface (slave side) 406 into data 703 transmitted to the bus interface (master side) 405 based on the swap instruction information 504.

For example, the endian conversion mechanism 105 performs conversion based on the conversion object data format of the header structure depicted in the rectangle 603. The data of the offset values 0 to 3 storing the member variable attr[4] is one-byte data and therefore is not converted by the endian conversion mechanism 105.

The data of the offset values 4 and 5 storing the member variable "type" is two-byte data and is subjected to the endian conversion by the endian conversion mechanism 105. Similarly, the data of the offset values 8 to B storing the member variable "size" and the data of the offset values C to F storing the member variable "opt" are four-byte data and are subjected to the endian conversion by the endian conversion mechanism 105. The offset values 6 and 7 without instruction may be handled in the same way as one-byte data.

Figure 8:
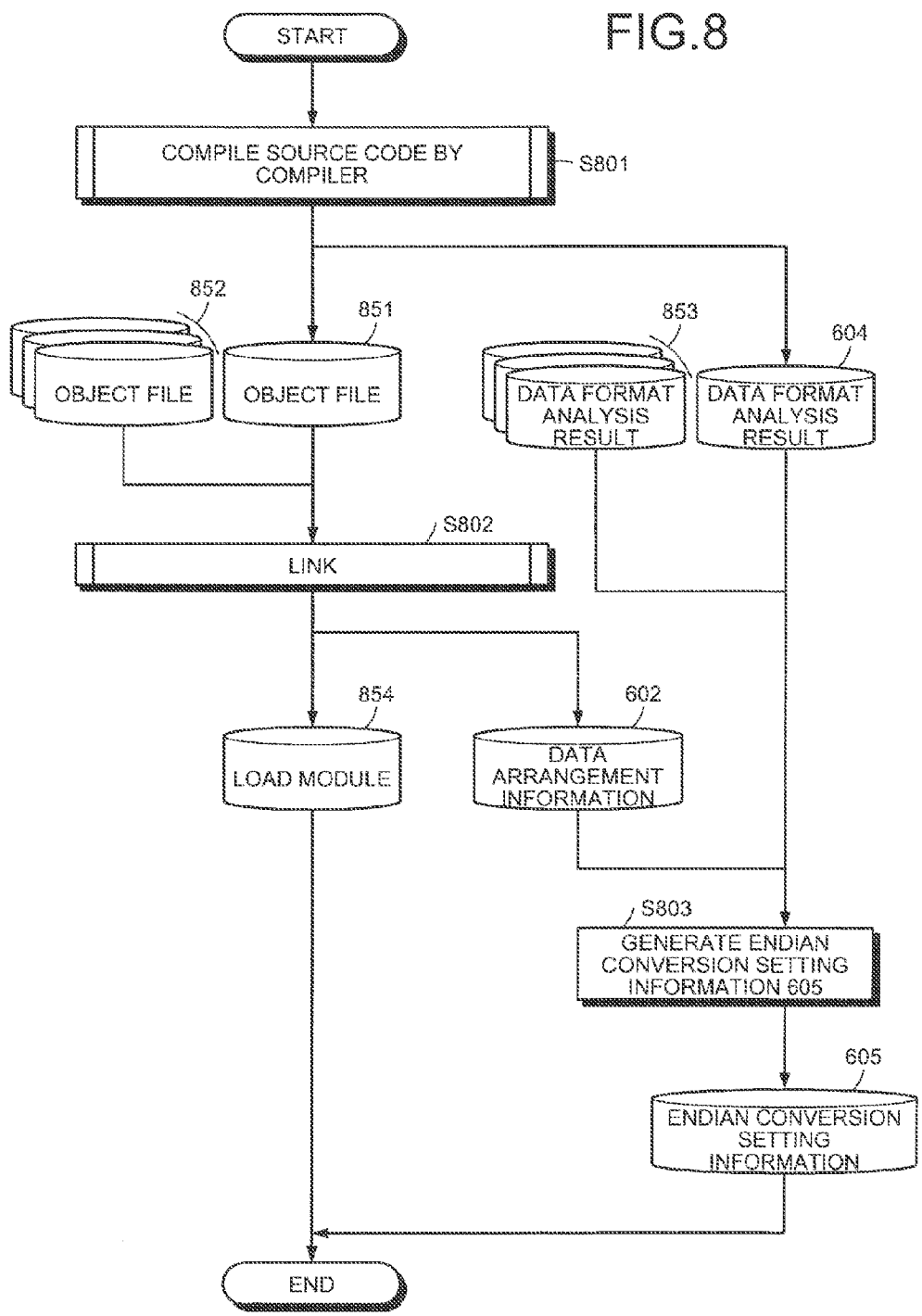
FIG. 8 is a flowchart of a program build process.
Figure 9:
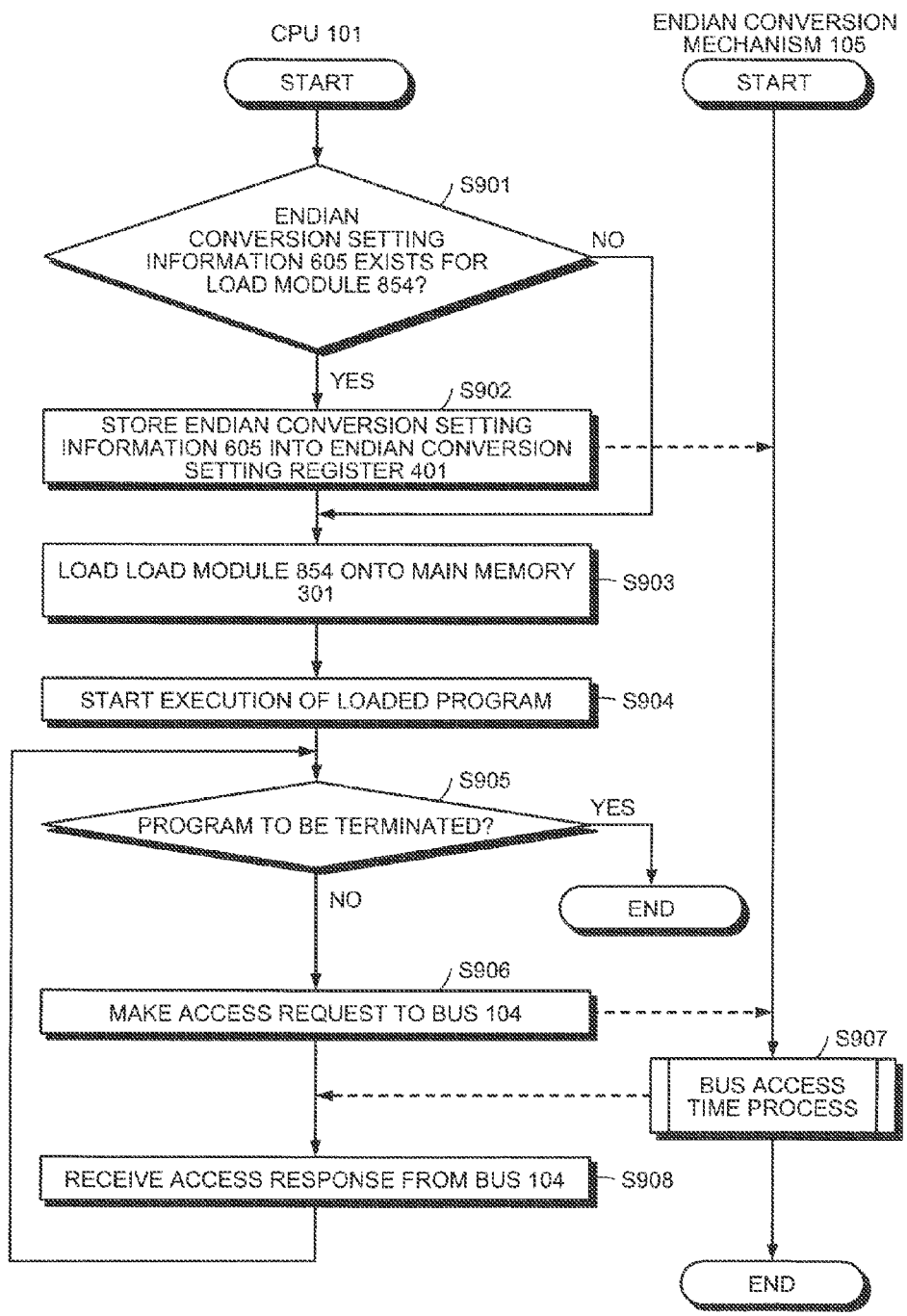
FIG. 9 is a flowchart of a program execution process.
Figure 10:
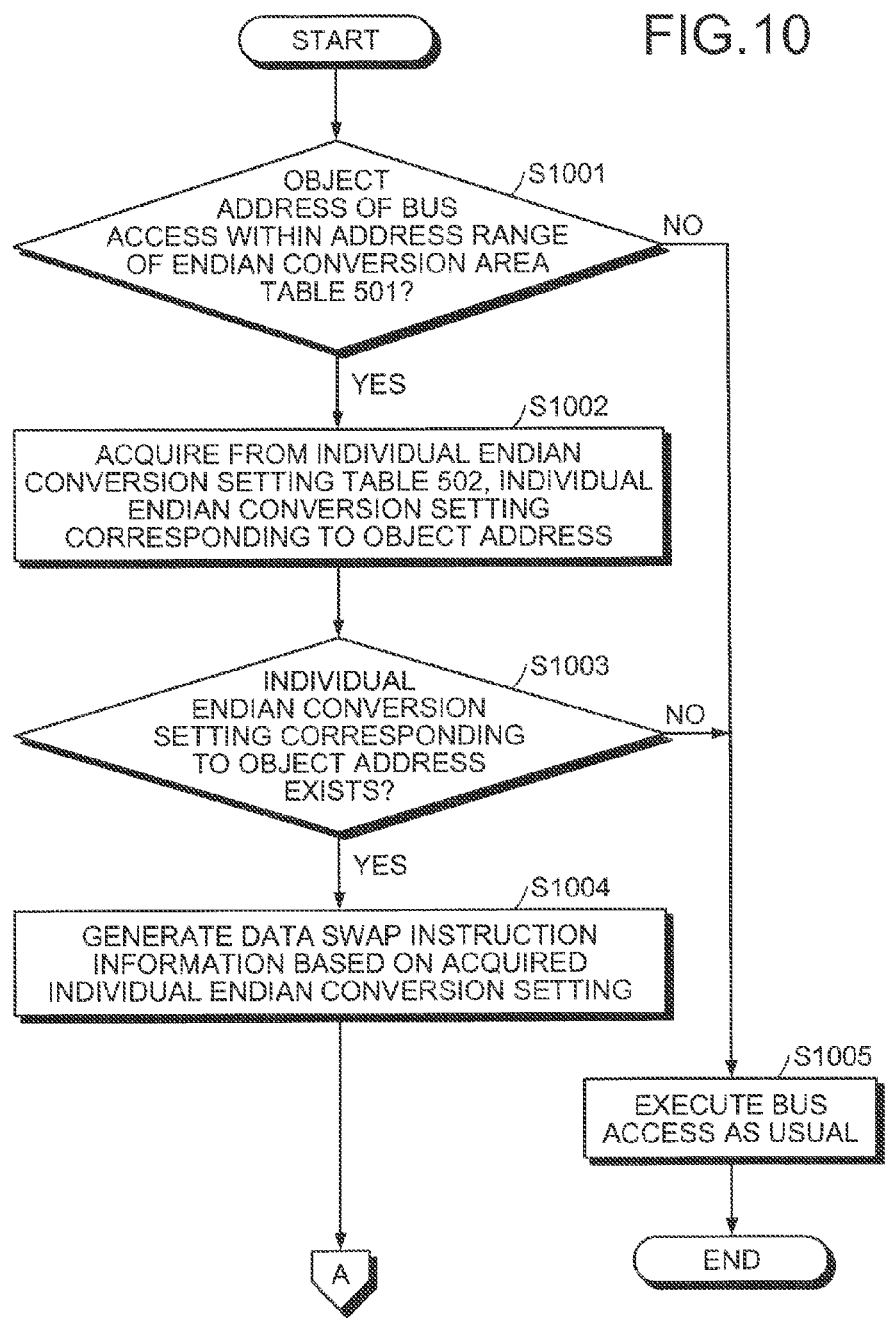
FIG. 10 is a flowchart (part 1) of a bus access time process according to the first embodiment.
Figure 11:
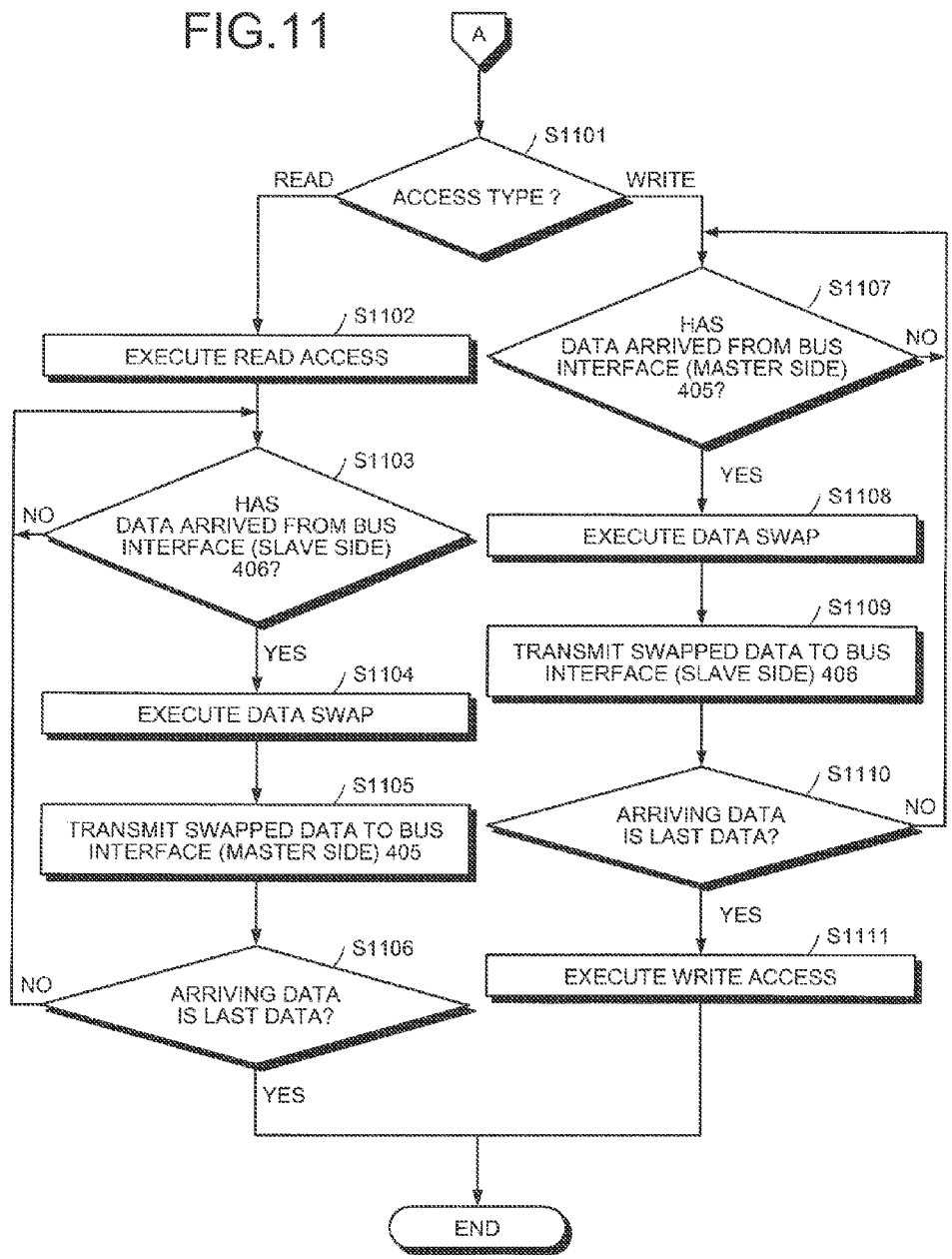
FIG. 11 is a flowchart (part 2) of the bus access time process according to the first embodiment.

Based on the above description, the system 100 uses the already generated endian conversion setting and the endian conversion mechanism 105 to perform the endian conversion during execution of the program. FIG. 8 depicts a process at the time of program building and FIG. 9 depicts an execution process of the built program. FIGS. 10 and 11 depict a process when a bus access occurs in the program in execution.

FIG. 8 is a flowchart of a program build process. An apparatus executing the program build process may be the system 100 or another apparatus having a cross compiler. In the description of FIG. 8, it is assumed that the CPU 101 in the system 100 executes the program build process.

The CPU 101 uses the compiler to compile source code (step S801). As a result of execution, the CPU 101 generates an object file 851 and a data format analysis result 604. The CPU 101 uses the linker to form a link based on the generated object file 851 and an object file group 852 generated by compiling other source codes (step S802). As a result of execution, the CPU 101 generates a load module 854 and data arrangement information 602.

The CPU 101 generates the endian conversion setting information 605 based on the generated data format analysis result 604 and a data format analysis result 853 generated by a designer, etc. (step S803).

FIG. 9 is a flowchart of a program execution process. The CPU 101 determines whether the endian conversion setting information 605 exists for the load module 854 to be executed (step S901). If the endian conversion setting information 605 exists (step S901: YES), the CPU 101 stores the endian conversion setting information 605 into the endian conversion setting register 401 in the endian conversion mechanism 105 (step S902). After the storage, or if the endian conversion setting information does not exist (step S901: NO), the CPU 101 loads the load module 854 onto the main memory 301 (step S903). After loading, the CPU 101 starts execution of the loaded program (step S904).

After starting execution of the program, the CPU 101 determines whether the program is to be terminated (step S905). If the program is to be terminated (step S905: YES), the CPU 101 terminates the program. If the program is to be continued (step S905: NO), the CPU 101 makes an access request to the bus 104 during the program execution (step S906). The CPU 101 waits until a response to the access request is received from the bus 104.

When detecting the access request to the bus, the endian conversion mechanism 105 executes a bus access time process (step S907). Details of the bus access time process will be described later with reference to FIGS. 10 and 11. As a result of execution of the bus access time process by the endian conversion mechanism 105, a response to the access request is output to the CPU 101. The CPU 101 receives the access response from the bus 104 (step S908) and goes to the operation at step S905.

FIG. 10 is a flowchart (part 1) of the bus access time process according to the first embodiment. The endian conversion mechanism 105 determines whether the object address of the bus access is within the address range of the endian conversion area table 501 (step S1001). If the object address is within the address range (step S1001: YES), the endian conversion mechanism 105 acquires individual endian conversion setting corresponding to the object address from the individual endian conversion setting table 502 (step S1002).

The endian conversion mechanism 105 then determines whether the individual endian conversion setting corresponding to the object address exists (step S1003). If the individual endian conversion setting corresponding to the object address exists (step S1003: YES), the endian conversion mechanism 105 generates data swap instruction information based on the acquired individual endian conversion setting (step S1004). After the generation, the endian conversion mechanism 105 goes to step S1101 depicted in FIG. 11.

If the object address is outside the address range (step S1001: NO), or if the individual endian conversion setting corresponding to the object address does not exist (step S1003: NO), the endian conversion mechanism 105 executes the bus access as usual (step S1005). After the execution, the endian conversion mechanism 105 terminates the bus access time process.

FIG. 11 is a flowchart (part 2) of the bus access time process according to the first embodiment. The endian conversion mechanism 105 determines an access type of the bus access (step S1101). If the access type is read (step S1101: READ), the endian conversion mechanism 105 executes a read access (step S1102). After execution, the endian conversion mechanism 105 determines whether data has arrived from the bus interface (slave side) 406 (step S1103).

If data has arrived (step S1103: YES), the endian conversion mechanism 105 executes data swap (step S1104). After the execution, the endian conversion mechanism 105 transmits the swapped data to the bus interface (master side) 405 (step S1105) and then determines whether the arriving data is the last data (step S1106).

If the arriving data is the last data (step S1106: YES), the endian conversion mechanism 105 terminates the bus access time process. If data has not arrived (step S1103: NO), or if the arriving data is not the last data (step S1106: NO), the endian conversion mechanism 105 goes to the operation at step S1103.

If the access type is write (step S1101: WRITE), the endian conversion mechanism 105 determines whether data has arrived from the bus interface (master side) 405 (step S1107).

If data has arrived (step S1107: YES), the endian conversion mechanism 105 executes data swap (step S1108). After the execution, the endian conversion mechanism 105 transmits the swapped data to the bus interface (slave side) 406 (step S1109), and then determines whether the arriving data is the last data (step S1110).

If the arriving data is the last data (step S1110: YES), the endian conversion mechanism 105 executes the write access (step S1111) and terminates the bus access time process. If data has not arrived (step S1107: NO), or if the arriving data is not the last data (step S1110: NO), the endian conversion mechanism 105 goes to the operation at step S1107.

As described above, according to the endian conversion method and system according to the first embodiment, a bus is notified of an address range subjected to the endian conversion at the start of a program and the endian conversion is performed for a range specified by the bus. This enables the system to perform the endian conversion in a location less likely to affect the performance in the system and to perform complicated conversion such as performing endian conversion for a portion of an address range within the bus width.

Although the system according to the first embodiment has latency of bus access extended by the addition of the endian conversion mechanism, the effect on the processing performance of the system is reduced because of the following two reasons. The first reason is that the frequency of bus access is smaller than the number of times the CPU accesses the cache. For example, even if the rate of cache miss is 10%, the bus access occurs only once out of ten cache accesses. Therefore, the effect on the processing performance of the system is reduced by performing the endian conversion in the bus rather than performing the endian conversion within the CPU. The second reason is that since the bus access is normally a burst access, the time required for the endian conversion can be overlapped with and hidden by another process.

The system according to the first embodiment may generate the endian conversion setting storing an address range subjected to the endian conversion when compiling source code of a program. This enables the system to cover the entire address range subjected to the endian conversion without causing missing endian conversion setting, etc.

The endian conversion mechanism according to the first embodiment may perform the endian conversion when the object address of the endian conversion is included in the endian conversion area and the individual endian conversion setting exists. As a result, the endian conversion mechanism need not execute a branch process in terms of whether the individual endian conversion setting exists when the object address is not included in the endian conversion area.

The endian conversion mechanism 105 according to the first embodiment has the entire individual endian conversion setting registered in the individual endian conversion setting table 502. The system 100 according to a second embodiment takes a form in which a portion of the individual endian conversion setting is registered into an endian conversion mechanism 1201 according to the second embodiment while the other individual endian conversion setting is stored in the main memory 301.

Figure 12:
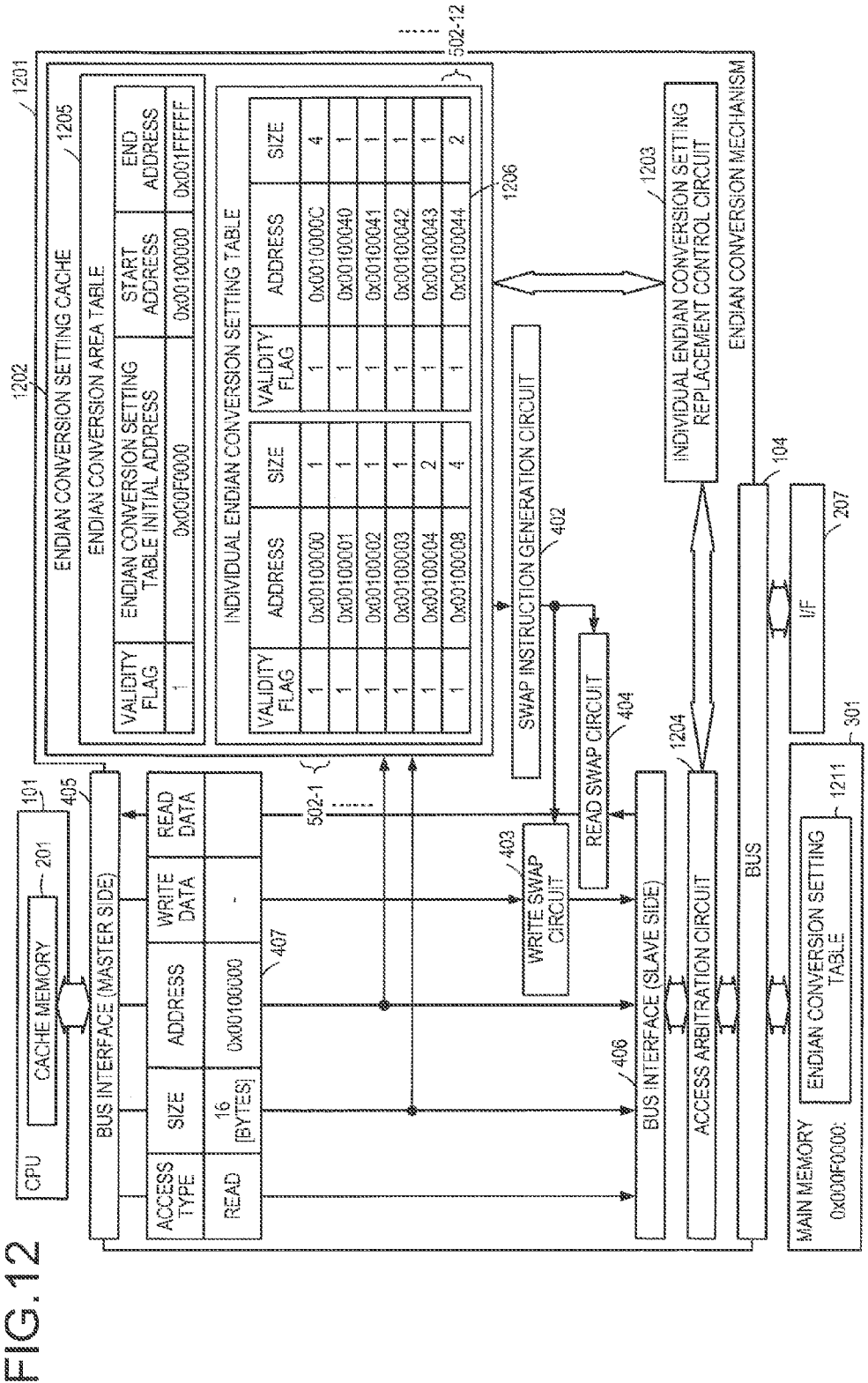
FIG. 12 is an explanatory view of the inside of an endian conversion mechanism 1201 according to a second embodiment.

FIG. 12 is an explanatory view of the inside of the endian conversion mechanism 1201 according to the second embodiment. The endian conversion mechanism 1201 includes an endian conversion setting cache 1202 instead of the endian conversion setting register 401 included in the endian conversion mechanism 105 according to the first embodiment. The endian conversion mechanism 1201 includes an individual endian conversion setting replacement control circuit 1203 and an access arbitration circuit 1204. The other hardware included in the endian conversion mechanism 1201 has the same function as the endian conversion mechanism 105 according to the first embodiment and therefore will not be described.

The main memory 301 according to the second embodiment stores an endian conversion setting table 1211. It is assumed that an area of storage of the endian conversion setting table 1211 is an area starting from the address 0x000F0000. The endian conversion setting table 1211 stored on the main memory 301 includes the endian conversion area information 606 and the individual endian conversion setting information 607 depicted in FIG. 6.

The endian conversion setting cache 1202 is a cache memory storing a portion of an endian conversion setting table. The endian conversion setting cache 1202 includes an endian conversion area table 1205 and an individual endian conversion setting table 1206.

The endian conversion area table 1205 includes an endian conversion setting table initial address field in addition to the endian conversion area table 501. The endian conversion setting table initial address field stores a value of an initial address that is the storage destination in the main memory 301 for the endian conversion setting table set in the endian conversion setting cache 1202. For example, since the endian conversion setting table 1211 is set in the endian conversion mechanism 1201 depicted in FIG. 12, 0x000F0000 is stored in the endian conversion setting table initial address field.

The individual endian conversion setting table 1206 has the same fields as the individual endian conversion setting table 502. Therefore, the fields of the individual endian conversion setting table 1206 will not be described. It is assumed that up to 12 entries can be registered in the individual endian conversion setting table 1206 and the entries 502-1 to 502-12 are registered. The entries 502-13 and 502-14 are not registered in the individual endian conversion setting table 1206 and are stored in the endian conversion setting table 1211.

The individual endian conversion setting replacement control circuit 1203 is a circuit controlling replacement in the individual endian conversion setting table 1206. For example, the individual endian conversion setting replacement control circuit 1203 acquires and writes information of one entry from the main memory 301 into a record of the individual endian conversion setting table 1206. For example, if the entry 502-13 is registered to the individual endian conversion setting table 1206, the individual endian conversion setting replacement control circuit 1203 selects and overwrites one entry of the individual endian conversion setting table 1206 with the entry 502-13.

The access arbitration circuit 1204 is a circuit arbitrating between an access request to the bus 104 from the bus interface (slave side) 406 and an access request to the bus 104 from the individual endian conversion setting replacement control circuit 1203. For example, the access arbitration circuit 1204 has a buffer capable of storing an access request and, while access consequent to one of the access requests is occurring, if the other access request is made, the access arbitration circuit 1204 buffers the other access request. After returning an access response to the one access request, the access arbitration circuit 1204 notifies the bus 104 of the other access request.

The system 100 uses the endian conversion mechanism 1201 depicted in FIG. 12 to perform the endian conversion. A program build process and a program execution process according to the second embodiment are equivalent to the program build process and the program execution process according to the first embodiment and therefore will not be described. A bus access time process (part 2) according to the second embodiment is equivalent to the bus access time process (part 2) according to the first embodiment and therefore will not be described.

Figure 13:
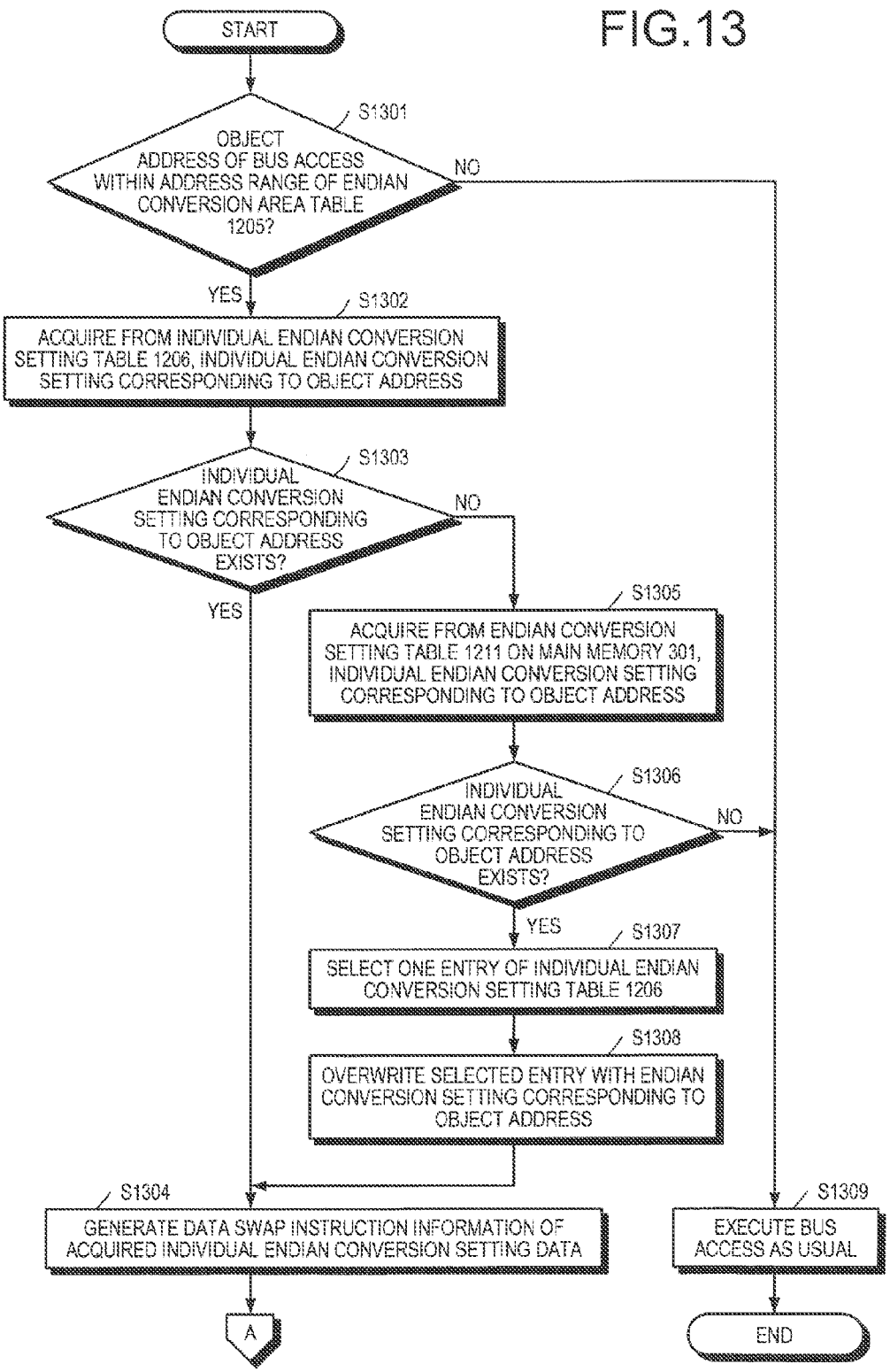
FIG. 13 is a flowchart (part 1) of the bus access time process according to the second embodiment.

FIG. 13 is a flowchart (part 1) of the bus access time process according to the second embodiment. The endian conversion mechanism 1201 determines whether the object address of the bus access is within the address range of the endian conversion area table 1205 (step S1301). If the object address is within the address range (step S1301: YES), the endian conversion mechanism 1201 acquires individual endian conversion setting corresponding to the object address from the individual endian conversion setting table 1206 (step S1302).

The endian conversion mechanism 1201 then determines whether the individual endian conversion setting corresponding to the object address exists (step S1303). If the individual endian conversion setting corresponding to the object address exists (step S1303: YES), the endian conversion mechanism 1201 generates data swap instruction information based on the acquired individual endian conversion setting (step S1304). After the generation, the endian conversion mechanism 1201 goes to step S1101 depicted in FIG. 11.

If the individual endian conversion setting corresponding to the object address does not exist (step S1303: NO), the endian conversion mechanism 1201 acquires the individual endian conversion setting corresponding to the object address from the endian conversion setting table 1211 on the main memory 301 (step S1305). The individual endian conversion setting information 607 on the main memory 301 is data included in the endian conversion setting information stored in the information stored in the endian conversion setting table initial address field.

The endian conversion mechanism 1201 then determines whether the individual endian conversion setting corresponding to the object address exists (step S1306). If the individual endian conversion setting corresponding to the object address exists (step S1306: YES), the endian conversion mechanism 1201 selects one entry of the individual endian conversion setting table 1206 (step S1307). In a selecting method of the entry, if an empty entry exists, the empty entry is directly selected. In the selecting method of the entry, if no empty entry exists, one entry is selected according to a substitution algorithm such as Least Recently Used (LRU) and Least Frequently Used (LFU).

After the selection, the endian conversion mechanism 1201 overwrites the selected entry with the endian conversion setting corresponding to the object address (step S1308). After overwriting, the endian conversion mechanism 1201 goes to the operation at step S1304.

If the object address is outside the address range (step S1301: NO), or if the individual endian conversion setting corresponding to the object address does not exist (step S1306: NO), the endian conversion mechanism 105 executes the bus access as usual (step S1309). After the execution, the endian conversion mechanism 1201 terminates the bus access time process.

As described above, according to the endian conversion method and system according to the second embodiment, a portion of the individual endian conversion setting is registered into the endian conversion mechanism while the other individual endian conversion setting is stored in the main memory. This enables the endian conversion method according to the second embodiment to suppress the storage area storing the individual endian conversion setting. If an address subjected to the endian conversion has temporal locality, a frequency of replacement of the individual endian setting is reduced and therefore, the system can reduce overhead in terms of performance. The address having temporal locality corresponds to an address at which a static variable is stored, for example. The static variable is used only in a declared function and therefore causes temporal locality.

The system 100 according to the first and second embodiments notifies the endian conversion mechanisms 105 and 1201 of the endian conversion setting when a program is loaded. The system 100 according to a third embodiment notifies an endian conversion mechanism 1401 of the endian conversion setting when a program is executed. It is assumed that the endian conversion mechanism 1401 according to the third embodiment is the same hardware as the endian conversion setting cache 1202 included in the endian conversion mechanism 1201 according to the second embodiment.

Figure 14:
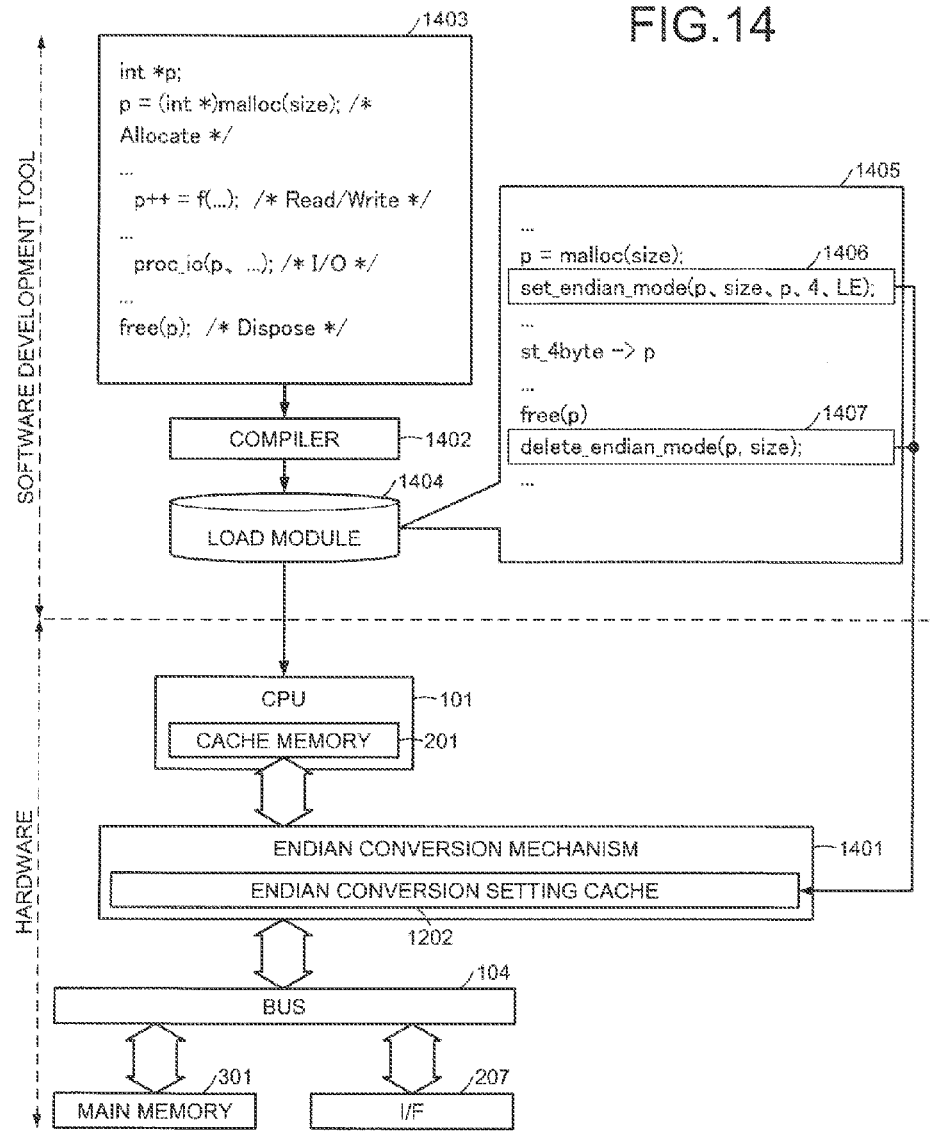
FIG. 14 is an explanatory view of endian conversion operation of the system 100 according to a third embodiment.

FIG. 14 is an explanatory view of endian conversion operation of the system 100 according to the third embodiment. At the time of software development, an apparatus for software development uses a function of a compiler 1402 to analyze source code 1403 and extracts a location to which a registration object address to be subjected to the endian conversion is allocated. For example, the compiler 1402 extracts the malloc( ) function and the new operator allocating the heap area or realloc( ) function, etc. reallocating the heap area. Similarly, the compiler 1402 extracts the free( ) function, the delete operator, etc., releasing the heap area. The registration object address is within an address range of a variable stored in the heap area and global data in which a global variable is stored.

After the extraction, the apparatus for software development uses the compiler 1402 to add an Application Programming Interface (API) call for giving notification of the endian conversion setting to a location before the location subjected to the endian conversion. The location before the location subjected to the endian conversion is a location to which the registration object address is allocated, for example. Similarly, the apparatus for software development uses the compiler 1402 to add an API call for releasing the endian conversion setting to a location at which the need for the endian conversion is eliminated. The need for the endian conversion is eliminated at a location where the registration object address is released, for example.

An image of binary code of a load module 1404 with the API calls added is a code image 1405. To the code image 1405, a code 1406 and a code 1407 are added. The code 1406 is a code added after the malloc( ) function and is the API "set_endian_mode(p,size,p,4,LE)" giving notification of the endian conversion setting.

A first argument of set_endian_mode is the initial address of the registration object address and is set in the start address field of the endian conversion area table 1205. A second argument is a size of the registration object address and a result of addition thereof to the first argument is set in the end address field of the endian conversion area table 1205. A third argument is an address of the individual endian conversion setting of the registration object and is set in the address field of the individual endian conversion setting table 1206. A fourth argument is a size of the individual endian conversion setting of the registration object and is set in the size field of the individual endian conversion setting table 1206. A fifth argument is stored as an identifier indicative of ether little endian or big endian.

Similarly, the code 1407 is added after the free( ) function and the API "delete_endian_mode(p,size)" giving notification of deletion of the endian conversion setting is added. A first argument of delete_endian_mode is the initial address of the deletion object address. A second argument is a size of the deletion object address. A designer of the program may add commend codes using the APIs into the source code.

The CPU 101 executes the load module 1404 and when the API for giving notification of the endian conversion setting is executed during execution of the program, the CPU 101 notifies the endian conversion mechanism 1401 of the endian conversion setting information. The notified endian conversion mechanism 1401 registers the endian conversion setting information to the endian conversion setting cache 1202. It is assumed that the system 100 has a form of memory-mapped I/O allowing an address space of devices to coexist in the address space of the RAM 103. Therefore, the CPU 101 can access an address assigned to the endian conversion setting cache 1202. An endian conversion setting information registration process will be described later with reference to FIG. 16.

When the API for giving notification of deletion of the endian conversion setting is executed during execution of the program, the CPU 101 notifies the endian conversion mechanism 1401 of the deletion of the endian conversion setting information. An endian conversion setting information deletion process will be described later with reference to FIG. 17.

As described above, the endian conversion mechanism 1401 can perform the endian conversion at the timing of bus access from the CPU 101 for the address set by set_endian_mode( ).

Figure 15:
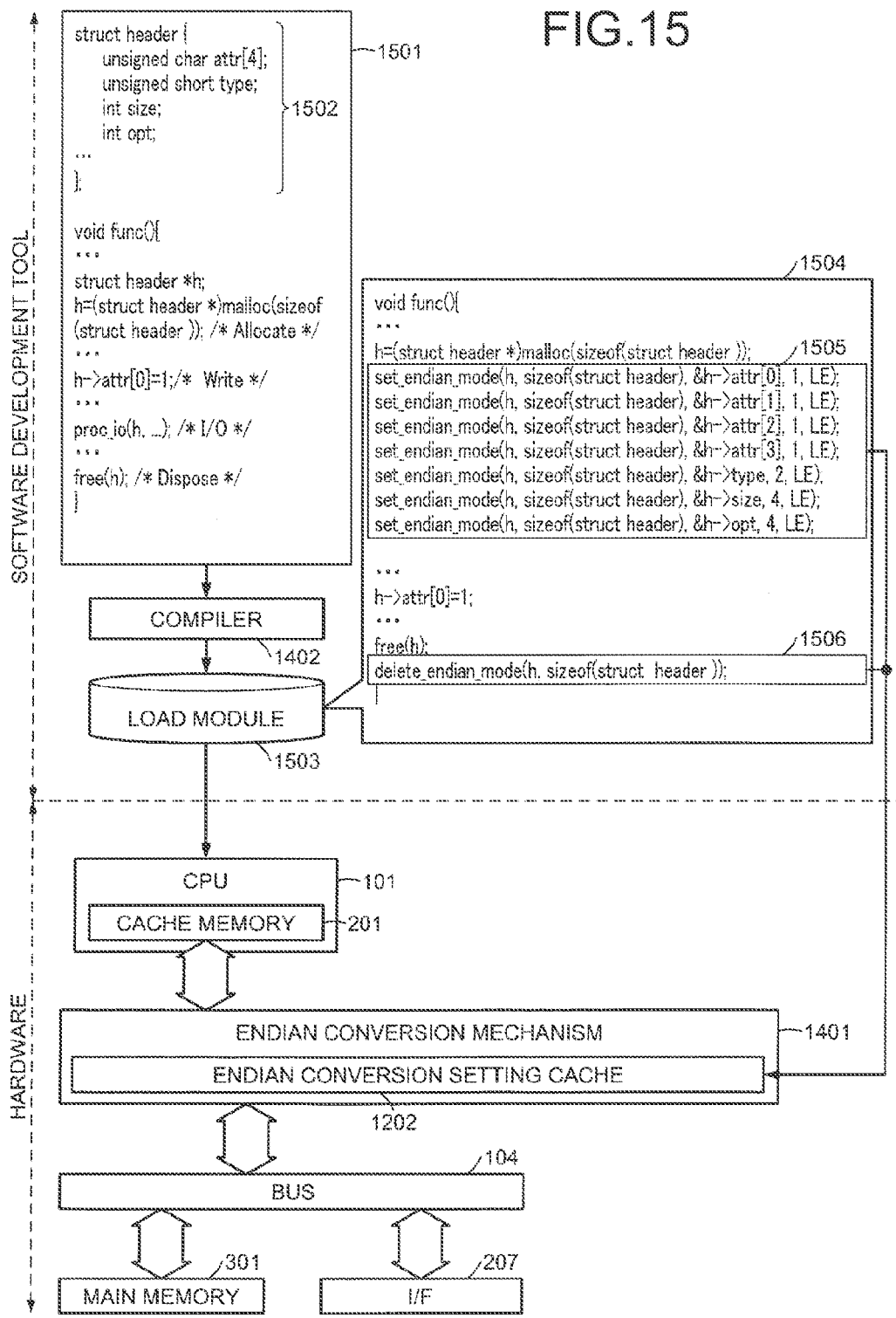
FIG. 15 is an explanatory view of an addition example of APIs when a registration object of an endian conversion setting is a structure.

FIG. 15 is an explanatory view of an addition example of APIs when a registration object of the endian conversion setting is a structure. A source code 1501 includes definition information 1502 of a header structure and variables allocated to the heap area are defined in the form of the header structure. The apparatus for software development uses the compiler 1402 to compile the source code 1501 and generates a load module 1503. An image of binary code of the load module 1503 with the API calls added is a code image 1504. To the code image 1504, a code 1505 and a code 1506 are added.

The code 1505 has set_endian_mode( ) added to each member defined in the header structure. For example, "set_endian_mode(h,sizeof(struct header),&h→attr[0],1,LE)" is added to the top of the code 1505.

Arguments will be described. A first argument is set as the initial address of the registration object address. A second argument is set as a size of the registration object address, i.e., a size of the header structure. A third argument is set as an address of the individual endian conversion setting of the registration object, i.e., an address of h→attr[0]. A fourth argument is set as a size of the individual endian conversion setting of the registration object, i.e., a size of h→>attr[0], which is 1.

Similarly, in set_endian_mode( ) from second to fourth lines, h→attr[1] to h→attr[3] are added as the individual endian conversion setting of the registration object. In set_endian_mode( ) from fifth to seventh lines, h→type, h→size, and h→opt are added as the individual endian conversion setting of the registration object. In the code 1506, delete_endian_mode( ) is added. The deletion is equivalent to the process described with reference to FIG. 15 and therefore, will not be described.

Figure 16:
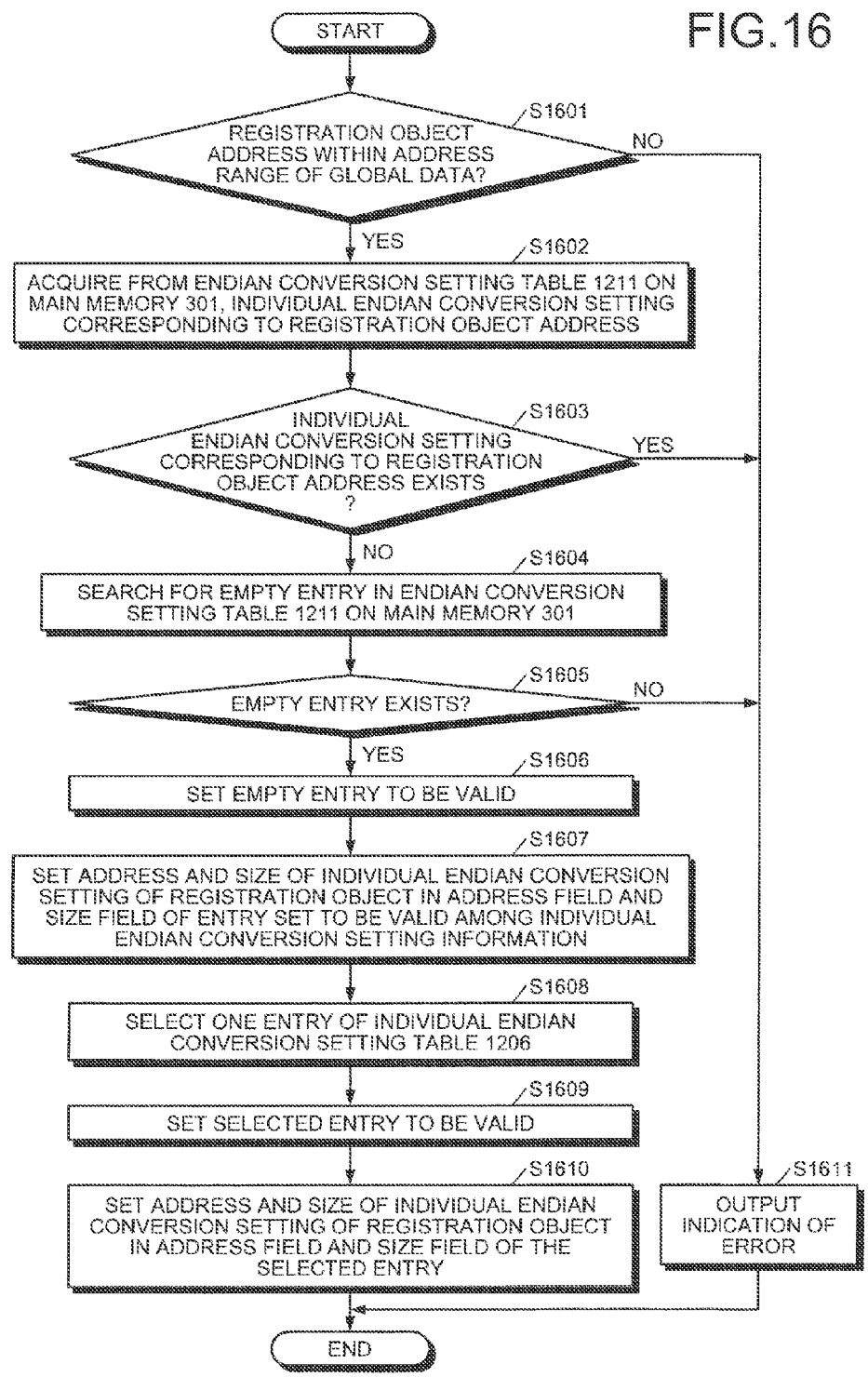
FIG. 16 is a flowchart of an endian conversion setting information registration process.

FIG. 16 is a flowchart of the endian conversion setting information registration process. The endian conversion mechanism 1401 determines whether a registration object address is within an address range of global data (step S1601). If the registration object address is within the address range (step S1601: YES), the endian conversion mechanism 1401 acquires individual endian conversion setting corresponding to the registration object address from the endian conversion setting table 1211 on the main memory 301 (step S1602).

The endian conversion mechanism 1401 then determines whether the individual endian conversion setting corresponding to the registration object address exists (step S1603). If the individual endian conversion setting does not exist (step S1603: NO), the endian conversion mechanism 1401 searches for an empty entry of the endian conversion setting on the main memory 301 (step S1604). After the search, the endian conversion mechanism 1401 determines whether an empty entry exists (step S1605).

If an empty entry exists (step S1605: YES), the endian conversion mechanism 1401 sets the empty entry to be valid (step S1606). The endian conversion mechanism 1401 then sets the address and the size of the individual endian conversion setting of the registration object in the address field and the size field of the entry set valid in the individual endian conversion setting information (step S1607). After setting, the endian conversion mechanism 1401 selects one entry of the individual endian conversion setting table 1206 (S1608). The selecting method of the entry at step S1608 may be the method described at step S1307.

After the selection, the endian conversion mechanism 1401 sets the selected entry to be valid (step S1609). After setting, the endian conversion mechanism 1401 sets the address and the size of the individual endian conversion setting of the registration object in the address field and the size field of the selected entry (step S1610) and terminates the endian conversion setting information registration process.

If the registration object address is not within the address range (step S1601: NO), the endian conversion mechanism 1401 outputs indication of an error (step S1611) and terminates the endian conversion setting information registration process. The error may be output to the CPU 101 or may be a status register in the endian conversion mechanism 1401 etc.

If no empty entry exists (step S1605: NO), or if the individual endian conversion setting exists (step S1603: YES), the endian conversion mechanism 1401 goes to the operation at step S1611.

Figure 17:
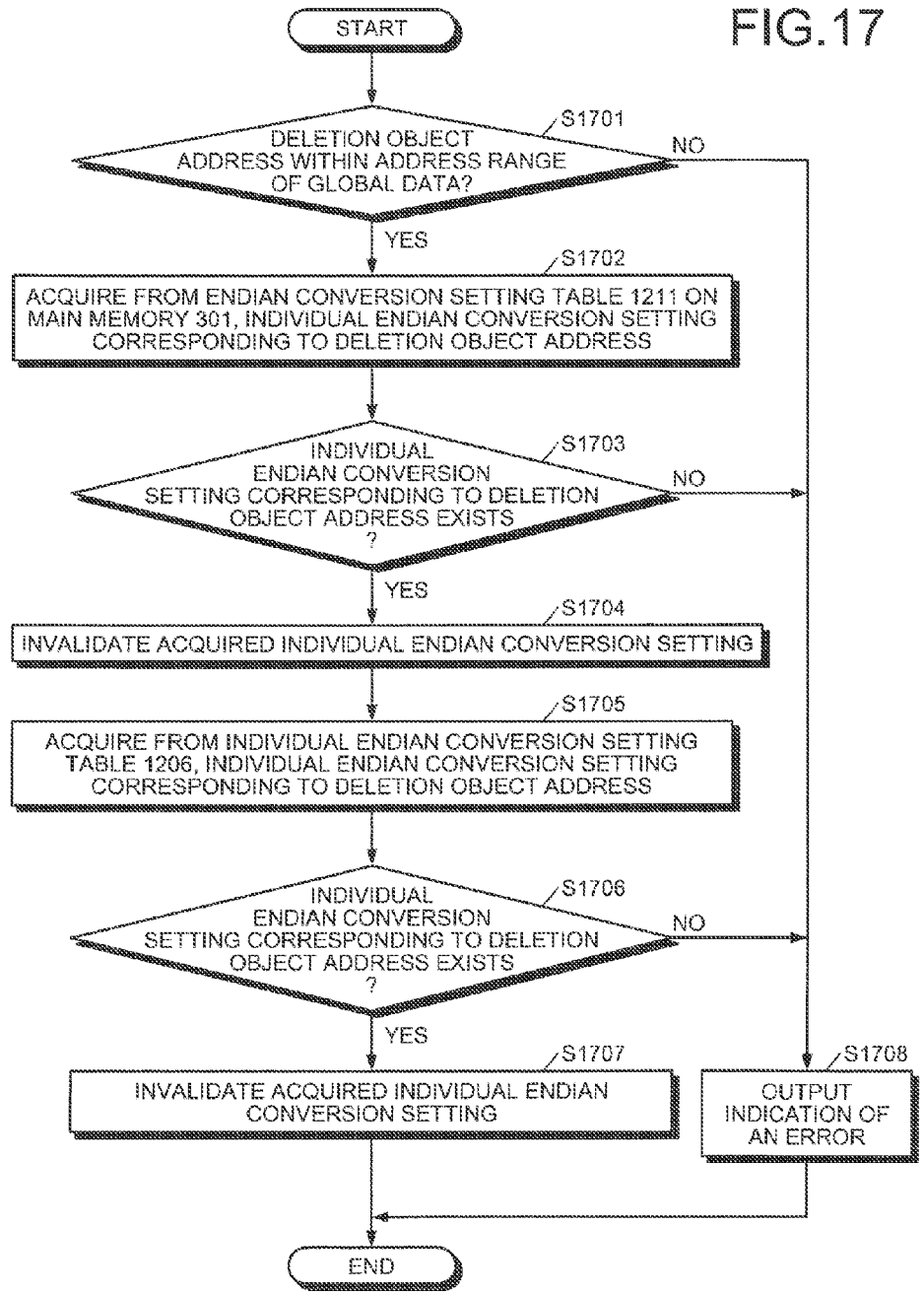
FIG. 17 is a flowchart of an endian conversion setting information deletion process.

FIG. 17 is a flowchart of the endian conversion setting information deletion process. The endian conversion mechanism 1401 determines whether a deletion object address is within an address range of global data (step S1701). If the deletion object address is within the address range (step S1701: YES), the endian conversion mechanism 1401 acquires the individual endian conversion setting corresponding to the deletion object address from the endian conversion setting table 1211 on the main memory 301 (step S1702).

The endian conversion mechanism 1401 then determines whether the individual endian conversion setting corresponding to the deletion object address exists (step S1703). If the corresponding individual endian conversion setting exists (step S1703: YES), the endian conversion mechanism 1401 invalidates the acquired individual endian conversion setting (step S1704). After the invalidation, the endian conversion mechanism 1401 acquires the individual endian conversion setting corresponding to the deletion object address from the individual endian conversion setting table 1206 (step S1705).

The endian conversion mechanism 1401 then determines whether the individual endian conversion setting corresponding to the deletion object address exists (step S1706). If the individual endian conversion setting corresponding to the deletion object address exists (step S1706: YES), the endian conversion mechanism 1401 invalidates the acquired individual endian conversion setting (step S1707) and terminates the endian conversion setting information deletion process.

If the individual endian conversion setting corresponding to the deletion object address does not exist (step S1706: NO), the endian conversion mechanism 1401 terminates the endian conversion setting information deletion process. If the deletion object address is not within the address range (step S1701: NO), or if the corresponding individual endian conversion setting does not exist (step S1703: NO), the endian conversion mechanism 1401 outputs indication of an error (step S1708). After the output, the endian conversion mechanism 1401 terminates the endian conversion setting information deletion process.

As described above, according to the endian conversion method and system according to the third embodiment, when the global data is secured during execution, the individual endian conversion setting is registered and when the global data is released, the individual endian conversion setting is deleted. As a result, the endian conversion mechanism according to the third embodiment may have only the individual endian conversion setting corresponding to the secured global data. Therefore, the endian conversion mechanism according to the third embodiment can reduce the size of the individual endian conversion setting table as compared to the endian conversion mechanism according to the second embodiment.

The first to third embodiments are based on the premise that all the addresses subjected to the endian conversion setting have the individual endian conversion setting. In a fourth embodiment, the endian conversion mechanism 105 corresponding to data having a repeated structure such as an array will be described.

Figure 18:
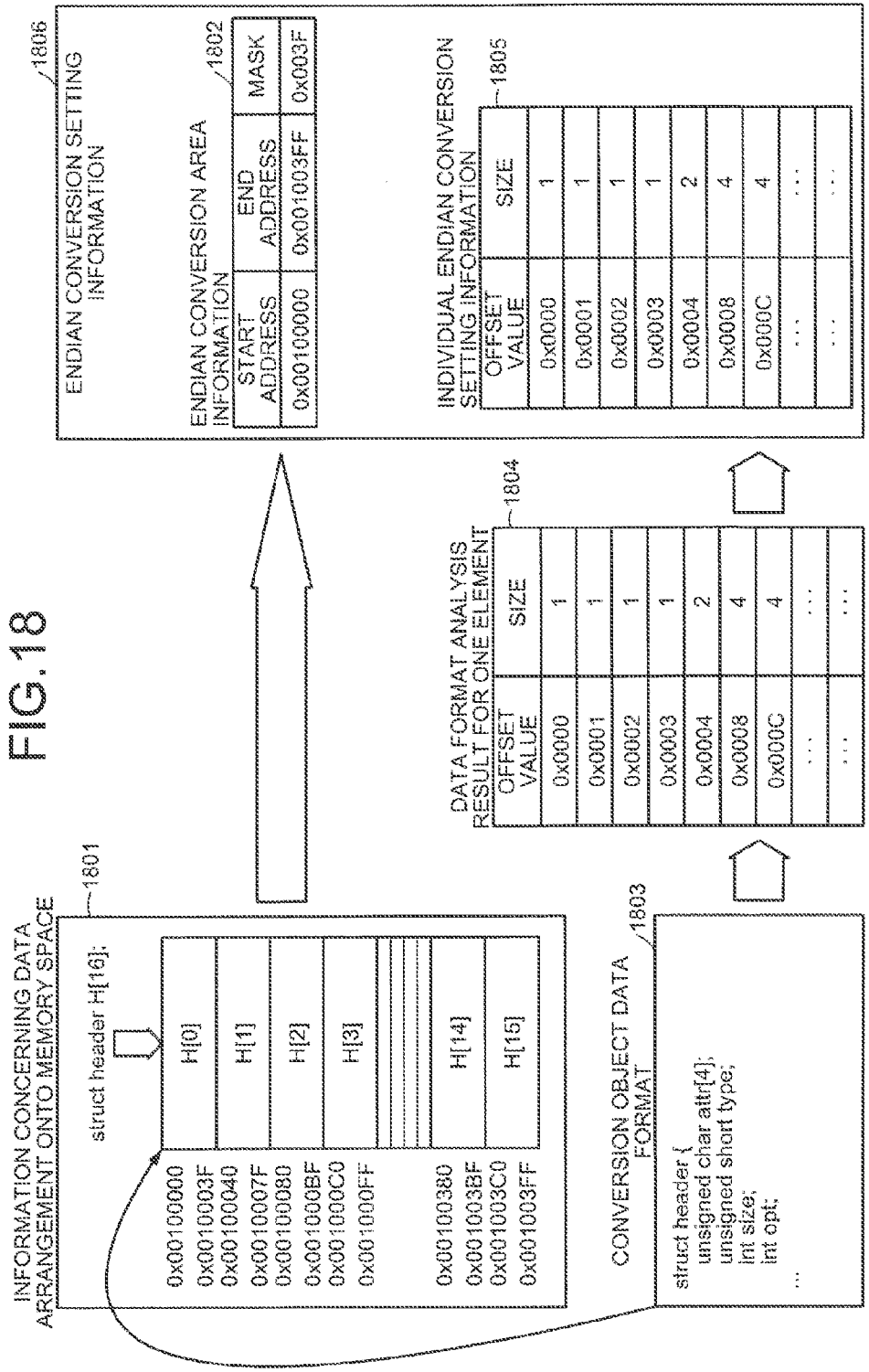
FIG. 18 is an explanatory view of endian conversion operation of the system 100 according to a fourth embodiment.

FIG. 18 is an explanatory view of endian conversion operation of the system 100 according to the fourth embodiment. The linker assigns an array acting as a global variable present in a program to a memory space at the time of generation of a load module. For example, for information on data arrangement onto a memory space depicted in a rectangle 1801, the linker assigns a global variable H[16] having a form of a header structure depicted in a rectangle 1803 by using 0x00100000 as a base address.

Elements of H include H[0] assigned to 0x00100000, H[1] assigned to 0x00100040, H[2] assigned to 0x00100080, and H[3] assigned to 0x00100000. Elements are subsequently assigned from H[4] to H[15] such that one element size is set to 0x40. The last element H[15] is assigned to 0x001003FF. The one element size of 0x40 is a size of the header structure. From such data arrangement information, the linker generates endian conversion area information 1802.

The compiler analyzes offset values from the base addresses and sizes of members of the structure based on a conversion object data format of the header structure depicted in a rectangle 1803, at the time of generation of an object file to generate data format analysis result 1804 for one element. The data format analysis result 1804 for one element is information equivalent to the data format analysis result 604 according to the first embodiment and therefore, will not be described. The linker directly sets the data format analysis result 1804 for one element as individual endian conversion setting information 1805 and combines and sets the endian conversion area information 1802 and the individual endian conversion setting information 1805 as endian conversion setting information 1806.

The endian conversion area information 1802 is information including a mask field in addition to the endian conversion area information 606 according to the first embodiment. The mask field has a mask value for comparing an offset value of the data format analysis result 1804 for one element from the object address. For example, if the object address is 0x00100044, data of H[1].type is stored at the object address. In this case, the mask result is 0x00100044& (0x003F)=0x0004 and therefore, the mask result is identical to the offset value 0x004 of the data format analysis result 1804 for one element.

The endian conversion mechanism 105 according to the fourth embodiment will be described. The endian conversion mechanism 105 according to the fourth embodiment has entirely equivalent hardware and functions, except the storage contents of the endian conversion setting register 401 and the function of the swap instruction generation circuit 402, included in the endian conversion mechanism 105 according to the first embodiment. Therefore, the endian conversion mechanism 105 according to the fourth embodiment will not be described except the endian conversion setting register 401 and the swap instruction generation circuit 402. An endian conversion setting register 1901 and a swap instruction generation circuit 1902 included in the endian conversion mechanism 105 according to the fourth embodiment will be described with reference to FIG. 19.

Figure 19:
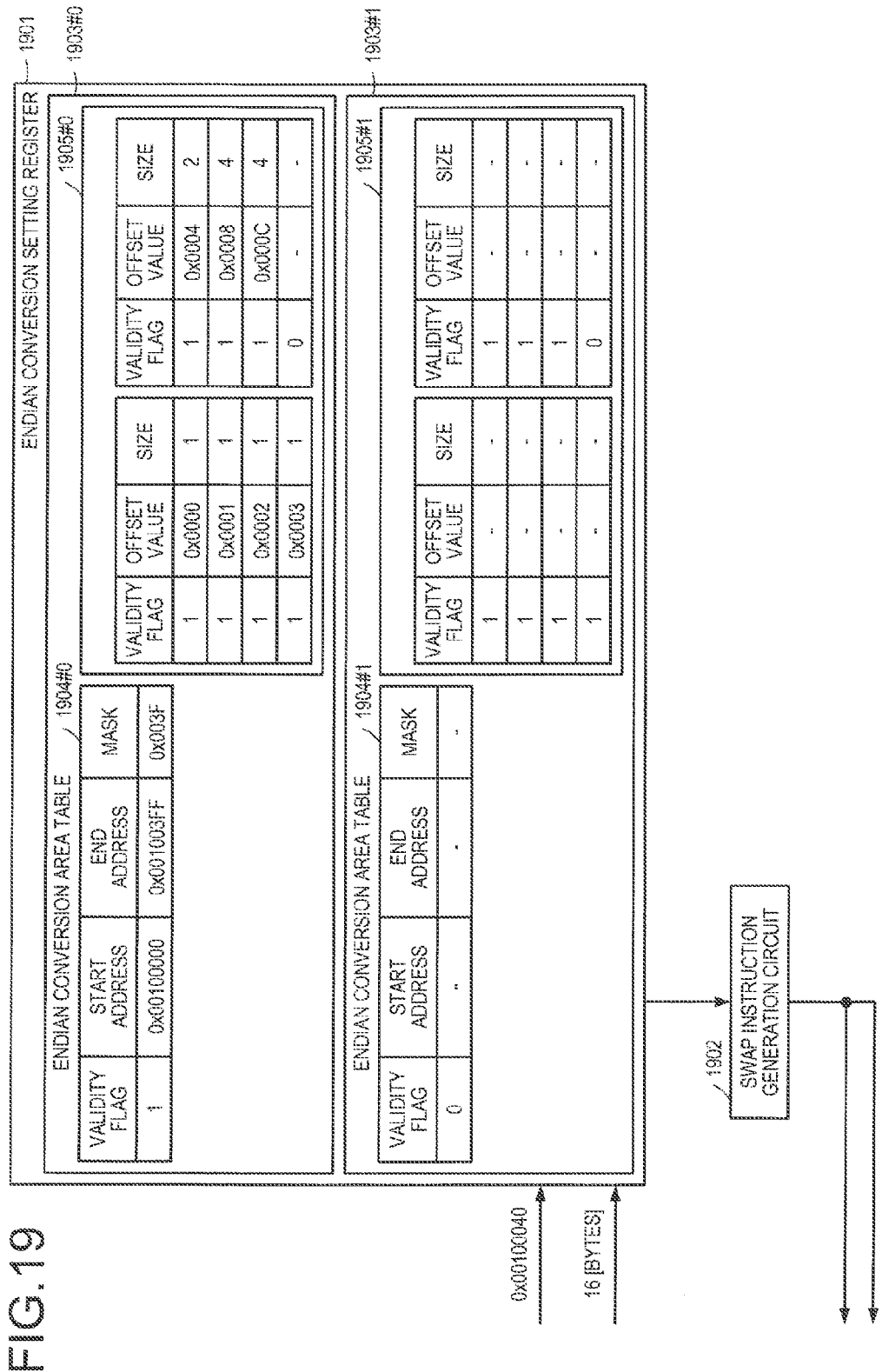
FIG. 19 is an explanatory view of an example of the contents of an endian conversion setting register 1901 according to the fourth embodiment.

FIG. 19 is an explanatory view of an example of the contents of the endian conversion setting register 1901 according to the fourth embodiment. The endian conversion setting register 1901 stores an endian conversion setting table 1903. In FIG. 19, an endian conversion setting table 1903#0 and an endian conversion setting table 1903#1 are included in the endian conversion setting register 1901. The endian conversion setting tables 1903#0 and 1903#1 respectively include endian conversion area tables 1904#0 and 1904#1 and individual endian conversion setting tables 1905#0 and 1905#1.

The endian conversion area table 1904 includes a mask field in addition to the field group included in the endian conversion area table 501 according to the first embodiment. Contents stored in the mask field are equivalent to the endian conversion area information 1802 and therefore, will not be described.

The individual endian conversion setting table 1905 is a table acquired by replacing the address field of the individual endian conversion setting table 502 according to the first embodiment with an offset value field. Contents stored in the offset value field are equivalent to the offset value of the data format analysis result 1804 and therefore, will not be described.

The swap instruction generation circuit 1902 masks the address field of the data format 407 with the mask field of the endian conversion area table 1904. The swap instruction generation circuit 1902 compares a value acquired by the masking with the offset value field of the individual endian conversion setting table 1905 to acquire the individual endian conversion setting.

The bus access time process according to the fourth embodiment has step S1002 replaced with "acquiring the individual endian conversion setting corresponding to an address acquired by masking the object address with the mask field from the individual endian conversion setting table 502". The other steps of the process are equivalent to the bus access time process according to the first embodiment and therefore, will not be described.

As described above, according to the endian conversion method and system according to the fourth embodiment, a conversion object address is masked and, if the masked address is identical to the offset value, the endian conversion is performed. This enables the system according to the fourth embodiment to support data having a repeated structure such as an array with smaller individual endian conversion setting.

For example, it is assumed that a CPU transfers an array of vertex data when making a request for a 3D process to a GPU. In such a case, the endian conversion mechanisms of the first to third embodiments must register the individual endian conversion setting for all the secured vertex data. However, the endian conversion mechanism according to the fourth embodiment can support such a case with the individual endian conversion setting for one element.

The endian conversion method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

An aspect of the embodiments produces an effect that the endian conversion is performed without affecting processing performance in a system and that the endian conversion with complicated data structure can be performed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An endian conversion method executed by a CPU, the endian conversion method comprising:
    executing a program including an endian conversion setting that includes (1) an address of a main memory to be subjected to endian conversion and (2) a size that corresponds to the address and with which the endian conversion is to be performed; and
    performing, when accessing the address included in the endian conversion setting, the endian conversion of data that is located at the address specified by the endian conversion setting and has the size specified by the endian conversion setting as corresponding to the address.

2. The endian conversion method according to claim 1, further comprising
    generating the endian conversion setting when source code of the program is compiled.

3. The endian conversion method according to claim 1, wherein
    the program includes endian conversion deletion notification for deleting the endian conversion setting when access to the address ends.

4. The endian conversion method according to claim 1, further comprising
    comparing the address included in the endian conversion setting and an address portion specified by a mask in the address of the main memory to be accessed, wherein
    the performing includes performing, based on a comparison result, the endian conversion of the data located at the address of the main memory.

5. An endian conversion method executed by an endian conversion mechanism capable of accessing a CPU that executes a program, the endian conversion method comprising:
    determining whether an address of a main memory to be accessed is included in an endian conversion area and whether an endian conversion setting exists for the address of the main memory, wherein the endian conversion setting includes (1) the address of the main memory to be subjected to endian conversion and (2) a size that corresponds to the address and with which the endian conversion is to be performed; and
    performing, based on the determination result and with reference to the endian conversion setting, the endian conversion of data that is located at the address specified by the endian conversion setting and has the size specified by the endian conversion setting as corresponding to the address.

6. The endian conversion method according to claim 5, wherein
    the determining includes determining whether the endian conversion setting exists for the address of the main memory, when in a cache memory, the address of the main memory is indicated to be included in the endian conversion area and the endian conversion setting is indicated to not exist for the address of the main memory.

7. The endian conversion method according to claim 5, further comprising
    generating, when source code of the program is compiled, information indicating whether the address of the main memory is included in the endian conversion area.

8. The endian conversion method according to claim 5, further comprising
    acquiring, when data corresponding to the address of the main memory is processed, the endian conversion setting for the address of the main memory.

9. A system comprising:
    a CPU that executes a program;
    a main memory;
    a generation circuit that generates, when an address of the main memory is accessed, a swap instruction to perform endian conversion of data that is located at the address specified by an endian conversion setting and has a size specified by the endian conversion setting as corresponding to the address, wherein (1) the address of the main memory to be subjected to the endian conversion and (2) the size that corresponds to the address and with which the endian conversion is to be performed are included in the endian conversion setting; and an endian conversion circuit that performs, based on the swap instruction, the endian conversion of the data.

10. The system according to claim 9, wherein
the generation circuit generates the swap instruction, based on the address of the main memory specified by the endian conversion setting included in the program.

11. The system according to claim 9, wherein
the generation circuit generates the swap instruction when the address of the main memory is included in an endian conversion area and the endian conversion setting exists for the address of the main memory.

12. The system according to claim 9, comprising
a swap circuit that based on the swap instruction, rearranges the data by a predetermined unit.

* * * * *